US012589710B2

(12) United States Patent
Iwama et al.

(10) Patent No.:  US 12,589,710 B2
(45) Date of Patent:      Mar. 31, 2026

(54) VEHICLE AIRBAG DEVICE AND PASSENGER PROTECTION DEVICE

(71) Applicant: TOYOTA JIDOSHA KABUSHIKI KAISHA, Aichi-ken (JP)

(72) Inventors: Toshiki Iwama, Toyota (JP); Mitsuyoshi Ohno, Miyoshi (JP); Yu Suzuki, Nagoya (JP); Tatsuya Hashido, Nishikasugai-gun (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/792,557

(22) Filed: Aug. 2, 2024

(65) Prior Publication Data

US 2025/0058736 A1      Feb. 20, 2025

(30) Foreign Application Priority Data

Aug. 14, 2023     (JP) ................................. 2023-132158

(51) Int. Cl.
| | |
|---|---|
| *B60R 21/233* | (2006.01) |
| *B60R 21/207* | (2006.01) |
| *B60R 21/231* | (2011.01) |
| *B60R 21/2338* | (2011.01) |

(52) U.S. Cl.
CPC .......... *B60R 21/233* (2013.01); *B60R 21/207* (2013.01); *B60R 21/2338* (2013.01); *B60R 2021/2074* (2013.01); *B60R 2021/23146* (2013.01); *B60R 2021/23386* (2013.01)

(58) Field of Classification Search
CPC . B60R 21/233; B60R 21/207; B60R 21/2338; B60R 2021/2074; B60R 2021/23146; B60R 2021/23386
See application file for complete search history.

(56) References Cited

U.S. PATENT DOCUMENTS

| | | | | |
|---|---|---|---|---|
| 10,005,417 | B2 * | 6/2018 | Ohno ................... | B60R 21/2334 |
| 10,189,431 | B2 * | 1/2019 | Yamamoto ............ | B60R 21/237 |
| 10,315,606 | B2 * | 6/2019 | Ohno .................... | B60R 21/207 |
| 10,328,889 | B2 * | 6/2019 | Sugie ................ | B60R 21/01552 |
| 10,471,920 | B2 * | 11/2019 | Dry ..................... | B60R 21/2165 |

(Continued)

FOREIGN PATENT DOCUMENTS

| | | | | | |
|---|---|---|---|---|---|
| EP | 1279568 | B1 * | 10/2004 | ......... | B60R 21/2338 |
| EP | 3792119 | A1 * | 3/2021 | ........... | B60R 21/207 |

(Continued)

OTHER PUBLICATIONS

JP-2022080415-A (machine translation) (Year: 2022).*

(Continued)

*Primary Examiner* — Jason D Shanske
*Assistant Examiner* — Joselynn Y Sliteris
(74) *Attorney, Agent, or Firm* — HAUPTMAN HAM, LLP

(57) ABSTRACT

A left-right pair of rear tethers is configured such that one-end portions thereof are anchored to a left-right pair of front-rear extension portions, other-end portions thereof are anchored to a seatback or to the vehicle body, and during passenger restraint each of a left-right pair of front-rear extension portions is pulled relatively in a seat diagonally rearward and downward direction such that a coupling portion approaches a femur area of a passenger.

15 Claims, 31 Drawing Sheets

(56)                    References Cited

U.S. PATENT DOCUMENTS

| | | | | |
|---|---|---|---|---|
| 10,518,733 | B2 * | 12/2019 | Dry .................. | B60R 21/01554 |
| 10,710,539 | B2 * | 7/2020 | Cho ..................... | B60R 21/207 |
| 11,124,147 | B2 * | 9/2021 | Line ..................... | B60R 21/207 |
| 11,285,904 | B2 * | 3/2022 | Jung .................... | B60R 21/207 |
| 11,772,592 | B2 * | 10/2023 | Min ..................... | B60R 21/207 |
| | | | | 280/743.2 |
| 2019/0016293 | A1 | 1/2019 | Saso | |

FOREIGN PATENT DOCUMENTS

| | | | | | |
|---|---|---|---|---|---|
| JP | 2019-018593 | A | | 2/2019 | |
| JP | 2019-147426 | A | | 9/2019 | |
| JP | 2019-218014 | A | | 12/2019 | |
| JP | 2022080415 | A | * | 5/2022 | |
| KR | 20210034245 | A | * | 3/2021 | |
| WO | WO-2004050435 | A1 | * | 6/2004 | ........... B60R 21/214 |
| WO | WO-2021121737 | A1 | * | 6/2021 | ....... B60R 21/23138 |

OTHER PUBLICATIONS

KR-20210034245-A (machine translation) (Year: 2021).*
WO-2021121737-A1 (machine translation) (Year: 2021).*
WO-2004050435-A1 (machine translation) (Year: 2004).*

* cited by examiner

74A(74)

74A(74)

76

76

1

VEHICLE AIRBAG DEVICE AND PASSENGER PROTECTION DEVICE

CROSS-REFERENCE TO RELATED APPLICATION

This application is based on and claims priority under 35 USC 119 from Japanese Patent Application No. 2023-132158 filed on Aug. 14, 2023, the disclosure of which is incorporated by reference herein.

BACKGROUND

Technical Field

The present disclosure relates to a vehicle airbag device and a passenger protection device.

Japanese Patent Application Laid-Open (JP-A) No. 2019-018593 discloses an airbag device including an inflator that generates gas at high pressure during an impact input, and a bag body (airbag) that expands and deploys from a seatback of a vehicle seat on receipt of gas supplied from the inflator. The bag body is configured including a trunk support section that is deployed from behind the head of a seated passenger to in front of the passenger, and a pair of head support sections that deploy at the left and right sides of the passenger's head and are connected to the trunk support section. In the technology described in JP-A No. 2019-018593, the deployed trunk support section is coupled to the seat or a vehicle body by a strap shaped coupling member. The deployed trunk support section is thereby configured such that movement thereof is restricted by the coupling member.

Moreover, JP-A 2019-218014 discloses an airbag device including an inflator, and an airbag that is deployed by gas supplied from the inflator. The airbag includes a rear expanding section that deploys at a back face side of a seat, a pair of side expanding sections that extend forward from left and right sides of the rear expanding section, and a pair of front expanding sections that extend toward the center from the side expanding sections, and that couple together with each other at the center to cover in front of the passenger. Furthermore, an airbag device described in JP-A 2019-218014 includes a strap shaped coupling member to couple a pair of support points provided at a front side of a seat and at left and right sides of the seat, to the side expanding sections.

In the technology described in JP-A No. 2019-018593 and JP-A No. 2019-218014, the coupling members are short due to the airbag being configured to deploy from a rear of the head of a passenger to in front of the head, and so there is a concern that the airbag might be pulled toward a seat lower side during airbag deployment and so be unable to pass between the head of the passenger and the roof of the vehicle. Moreover, were the coupling members to be long, although the airbag would readily pass above the head of the passenger during airbag deployment there would be a concern regarding the airbag body rising up during passenger restraint and there being a decrease in the contact surface area between the passenger and the airbag, and a concern that the airbag might escape to the upper side of the head of the passenger. Namely, there is room for improvement in both ease of airbag deployment and passenger restraint stability.

2

SUMMARY

The present disclosure provides a vehicle airbag device and a passenger protection device that are able to achieve both ease of deployment of an airbag and passenger restraint stability.

A vehicle airbag device of a first aspect includes an inflator that generates gas during a vehicle collision, an airbag that is supplied with the gas and expands and deploys from a seat rear side to a seat front side of an upper section of a vehicle seat, and a left-right pair of rear tethers that couple the airbag to a seatback of the vehicle seat or to a vehicle body. The airbag includes a front-rear chamber configured including a left-right pair of front-rear extension portions that expand and deploy toward the seat front side past left and right sides of a head of a passenger seated in the vehicle seat, and a coupling portion that links together, in a seat left-right direction, front end portions at completion of expansion and deployment of the left-right pair of front-rear extension portions, and an airbag body that expands and deploys at the seat rear side of the coupling portion toward a passenger side with a delay with respect to the front-rear chamber, and that is compressed so as to be sandwiched between a femur area and a chest area of the passenger while the front-rear extension portions are being stretched in a seat front-rear direction during passenger restraint to restrain the passenger. The left-right pair of rear tethers is configured such that one-end portions thereof are anchored to a left-right pair of front-rear extension portions, other-end portions thereof are anchored to the seatback or to the vehicle body, and during passenger restraint each of the left-right pair of front-rear extension portions is pulled relatively in a seat diagonally rearward and downward direction such that the coupling portion approaches the femur area of the passenger.

In the vehicle airbag device of the first aspect, gas generated from the inflator during a vehicle collision is supplied to the airbag, and the airbag is expanded and deployed from the seat rear side to the seat front side of the upper section of the vehicle seat. When this occurs, the left-right pair of front-rear extension portions of the front-rear chamber expand and deploy toward the seat front side past the left and right sides of the head of a passenger seated in the vehicle seat. The airbag body expands and deploys at the seat rear side of the coupling portion toward the passenger side with a delay to the front-rear chamber. The airbag body is compressed so as to be sandwiched between the femur area and the chest area of the passenger while the front-rear extension portions are being stretched in the seat front-rear direction during passenger restraint. The kinetic energy when the passenger is moving under inertia is absorbed by compression deformation of the airbag body. Moreover, the left-right pair of front-rear extension portions configures a flow path for gas, and bears and supports load imparted to the airbag body from the passenger. However, reference here to "pulled relatively in a seat diagonally rearward and downward direction" has a meaning broadly encompassing load acting in a seat diagonally rearward and downward direction on the left-right pair of front-rear extension portions such that the airbag body does not rise up.

The airbag is coupled to the seatback of the vehicle seat or to the vehicle body by the left-right pair of rear tethers. More precisely, the left-right pair of rear tethers includes respective one-end portions anchored to the left-right pair of front-rear extension portions, and respective other-end portion anchored to the seatback or vehicle body. The left-right pair of rear tethers, together with the front-rear chamber, bears and supports load imparted to the airbag body from the passenger. Moreover, during passenger restraint by the airbag, the left-right pair of front-rear extension portions is pulled relatively in the seat diagonally rearward and downward direction by the left-right pair of rear tethers such that the coupling portion approaches the femur area of the passenger. When this occurs, the airbag body expanded and deployed at the seat rear side of the coupling portion rotates so as to tilt toward the seat front side. This means that the airbag body enters deeply between the femur area and the chest area of the passenger, increasing the contact surface area between the passenger and the airbag. Rising up of the airbag body is thereby suppressed.

A vehicle airbag device of a second aspect is the first aspect, further including a left-right pair of pre-tensioner mechanisms provided at the seatback or at the vehicle body for pulling the left-right pair of rear tethers after completion of expansion and deployment of the airbag.

In the vehicle airbag device of the second aspect, the left-right pair of pre-tensioner mechanisms provided to the seatback or to the vehicle body is actuated after completion of expansion and deployment of the airbag, so as to pull the left-right pair of rear tethers. The left-right pair of front-rear extension portions is pulled strongly in the seat diagonally rearward and downward direction by the left-right pair of pre-tensioner mechanisms. Namely, the length of the left-right pair of rear tethers during passenger restraint by the airbag becomes shorter than the length of the left-right pair of rear tethers during expansion and deployment of the airbag. This means that the maximum length of the rear tether during expansion and deployment of the airbag can be set longer. The airbag is thereby able to pass more easily through a narrow gap above the head of the passenger, while the airbag body is also able to be reliably prevented from rising up during passenger restraint.

The vehicle airbag device of the third aspect is the second aspect, wherein the left-right pair of pre-tensioner mechanisms is provided left-right symmetrically at left and right side portions of the seatback.

In the vehicle airbag device of the third aspect, the left-right pair of rear tethers is pulled by the pair of pre-tensioner mechanisms provided with left-right symmetry, and so swaying of the airbag at completion of expansion and deployment in the seat height direction and the seat front-rear direction can be effectively suppressed with good balance.

A vehicle airbag device of any fourth aspect is the first aspect, wherein a coefficient of extension with respect to a length direction of the left-right pair of rear tethers is smaller than a coefficient of extension in a length direction of the left-right pair of front-rear extension portions.

In the vehicle airbag device of the fourth aspect, the left-right pair of front-rear extension portions is the main bearer of tensional load during expansion and deployment of the airbag, and are stretched thereby. Moreover, during passenger restraint by the airbag, the tensional load is distributed by the left-right pair of front-rear extension portions, and the inelastic left-right pair of rear tethers, and the airbag body is supported. The readily extensible left-right pair of front-rear extension portions extend further in the length direction as the upper body of the passenger tilts toward the seat front side. The inelastic left-right pair of rear tethers imparts load to the left-right pair of front-rear extension portions in the seat diagonally rearward and downward direction. This means that the airbag body rotates so as to tilt toward the seat front side, and deforms in a wedge shape in seat side view. As a result thereof, the contact surface area increases to a greater extent between the femur area of the passenger and the coupling portion of the airbag, and rising up of the airbag body is suppressed. The airbag is accordingly able, by using a simple configuration, to easily pass through the narrow gap above the head of the passenger, while also being able to suppress rising up of the airbag body.

A vehicle airbag device of a fifth aspect is the fourth aspect, wherein the left-right pair of rear tethers is configured from a material more inelastic than the left-right pair of front-rear extension portions.

In the vehicle airbag device of the fifth aspect, the coefficient of extension with respect to the length direction of the left-right pair of rear tethers can be made smaller than the coefficient of extension in the length direction of the left-right pair of front-rear extension portions by using differences in the coefficients of extension for the materials themselves. This means that, by using an even simpler configuration, the airbag is able to easily pass through the narrow gap above the head of the passenger, while also being able to suppress rising up of the airbag body.

An vehicle airbag device of any sixth aspect is the fourth aspect, wherein the left-right pair of rear tethers has a grain direction parallel to a length direction thereof, and the left-right pair of front-rear extension portions has a grain direction angled with respect to a length direction thereof.

In the vehicle airbag device of the sixth aspect, the coefficient of extension with respect to the length direction of the left-right pair of rear tethers can be made smaller than the coefficient of extension in the length direction of the left-right pair of front-rear extension portions by using differences in the grain directions. This means that, by using an even simpler configuration, the airbag is able to easily pass through the narrow gap above the head of the passenger, while also being able to suppress rising up of the airbag body.

An vehicle airbag device of a seventh aspect is the fourth aspect, wherein at least a portion of the left-right pair of rear tethers includes a reinforcement sewn portion sewn along a length direction thereof.

In the vehicle airbag device of the seventh aspect, stretching in the length direction of the left-right pair of rear tethers is suppressed by at least a portion of the reinforcement sewn portion being sewn along a length direction of the left-right pair of rear tethers. This means that an excellent advantageous effect is exhibited of, with an even simpler configuration, the airbag easily passing through the narrow gap above the head of the passenger, while also being able to suppress rising up of the airbag body.

A vehicle airbag device of an eighth aspect is the seventh aspect, wherein the reinforcement sewn portion is provided continuously along the length direction of the left-right pair of rear tethers.

In the vehicle airbag device of the eighth aspect, the reinforcement sewn portion is provided continuously along the length direction of the left-right pair of rear tethers, and so stretching in the length direction of the left-right pair of rear tethers is even more effectively suppressed.

A vehicle airbag device of the ninth aspect is the seventh aspect, wherein a plurality of reinforcement sewn portions is provided spaced apart from each other along the length direction of the left-right pair of rear tethers.

In the vehicle airbag device of the ninth aspect, in the left-right pair of rear tethers there are portions where the reinforcement sewn portions are provided alternately disposed along the length direction with portions wherein the reinforcement sewn portion are not provided. The left-right pair of rear tethers is according easily folded, enabling the airbag to be house compactly.

A vehicle airbag device of a tenth aspect is the first aspect, wherein the airbag body at completion of expansion and deployment opposes a head, a chest area, and an abdominal area of the passenger from a front side across a gap.

In the vehicle airbag device of the tenth aspect, the airbag body is expanded and deployed without interfering with the head, the chest area, and the abdominal area of the passenger. Moreover, during passenger restraint, the airbag body is able to achieve contact between the upper body of the passenger, including the head, the chest area, and the abdominal area, with the airbag body over a wide surface area, with this enabling a good reduction in load imparted to the passenger from the airbag body.

A vehicle airbag device of an eleventh aspect is the tenth aspect, wherein a configuration is adopted such that during restraint of the passenger, a lower face of the left-right pair of front-rear extension portions abuts left and right shoulders of the passenger.

In the vehicle airbag device of the eleventh aspect, during passenger restraint by the airbag, the left-right pair of front-rear extension portions are pulled in the seat diagonally rearward and downward direction by the left-right pair of rear tethers, and so the lower face of the left-right pair of front-rear extension portions abuts the left and right shoulders of the passenger. This thereby enables the position of the airbag body to be stabilized in the seat height direction with respect to the passenger head irrespective of differences in the build of the passenger.

A vehicle airbag device of a twelfth aspect is the first aspect, wherein each of the one-end portions of the left-right pair of rear tethers is connected to respective front portions of the left-right pair of front-rear extension portions at a position overlapping in a seat side view with the airbag body at the completion of expansion and deployment.

In the vehicle airbag device of the twelfth aspect, the left-right pair of rear tethers is connected to front portions of the left-right pair of front-rear extension portions at the position overlapping in seat side view with the airbag body at the completion of expansion and deployment, and so this enables the coupling portion to effectively approach the femur area of the passenger.

A vehicle airbag device of a thirteenth aspect is the first aspect, wherein the left-right pair of front-rear chambers is formed in a bag shape by peripheral edge portions of two sheets of superimposed base cloth being sewn at a sewn portion, and each of the left-right pair of rear tethers is sewn to the left-right pair of front-rear extension portions at a portion of the sewn portion.

In the vehicle airbag device of the thirteenth aspect, the left-right pair of rear tethers is configured with the left-right pair of rear tethers respectively sewn at the peripheral edge sewn section of the left-right pair of front-rear extension portions. This means that the left-right pair of rear tethers can be anchored to the left-right pair of front-rear extension portions and the strength of the airbag can also be maintained with a simpler configuration than cases in which the left-right pair of rear tethers is sewn to the left-right pair of front-rear extension portions at a position separate to the peripheral edge sewn section.

A vehicle airbag device of a fourteenth aspect is the thirteenth aspect, wherein the left-right pair of rear tethers are sewn together with a reinforcement cloth to the two sheets of base cloth of the left-right pair of front-rear extension portions at the peripheral edge sewn section.

In the vehicle airbag device of the fourteenth aspect, the strength at a portion where the left-right pair of rear tethers is sewn to the left-right pair of front-rear extension portions can be raised by the reinforcement cloth.

A passenger protection device of a fifteenth aspect includes a vehicle seat for a passenger to sit on, and the vehicle airbag device of any one of the first aspect to the fourteenth aspect installed at a seat rear side of an upper section of the vehicle seat.

In the passenger protection device of the fifteenth aspect, gas generated from an inflator during a vehicle collision is supplied into the airbag, and the airbag is expanded and deployed from the seat rear side to the seat front side of the upper section of the vehicle seat. When this occurs, the left-right pair of front-rear extension portions in the front-rear chamber expand and deploy to the seat front side past the left and right sides of the head of the passenger seated in the vehicle seat. Moreover, the airbag body expands and deploys at the seat rear side of the coupling portion toward the passenger with a delay to the front-rear chamber. During passenger restraint, the airbag body is compressed so as to be sandwiched between the femur area and the chest area of the passenger while the front-rear extension portions are being stretched in the seat front-rear direction. The kinetic energy when the passenger is moving under inertia is absorbed by compression deformation of the airbag body. Moreover, the left-right pair of front-rear extension portions configures a flow path for gas, and bears and supports load imparted to the airbag body from the passenger.

The left-right pair of rear tethers, together with the front-rear chamber, bears and supports load imparted to the airbag body from the passenger. Moreover, during passenger restraint by the airbag, the left-right pair of front-rear extension portions is pulled in the seat diagonally rearward and downward direction by the left-right pair of rear tethers, and the coupling portion approaches the femur area of the passenger. This means that the contact surface area between the passenger and the airbag is increased, and rising up of the airbag is suppressed.

The vehicle airbag device of the first aspect exhibits the excellent advantageous effect of being able to achieve both ease of deployment of the airbag and also passenger restraint stability.

The vehicle airbag device of the second aspect exhibits the excellent advantageous effect of being able to reliably prevent rising up of the airbag body during passenger restraint while the airbag also more easily passes through the narrow gap above the head of the passenger.

The vehicle airbag device of the third aspect exhibits the excellent advantageous effect of enabling swaying of the airbag at completion of expansion and deployment in the seat height direction and the seat front-rear direction to be effectively suppressed with good balance.

The vehicle airbag device of the fourth embodiment to the seventh embodiment each exhibit the excellent advantageous effect of being able to achieve both ease of deployment of the airbag and also passenger restraint stability using a simple configuration.

The vehicle airbag device of the eighth aspect exhibits the excellent advantageous effect of being able to more effectively suppress stretching in the length direction of the left-right pair of rear tethers.

The vehicle airbag device of the ninth aspect exhibits the excellent advantageous effect of being able to house the airbag compactly.

The vehicle airbag device of the tenth aspect exhibits the excellent advantageous effect of being able to achieve a good reduction in load imparted to the passenger from the airbag body during passenger restraint while also suppressing the airbag body from interfering with the head, the chest area, and the abdominal area of the passenger during expansion and deployment.

The vehicle airbag device of the eleventh aspect exhibits the excellent advantageous effect of being able to stabilize the seat height direction position of the airbag body with respect to the head of the passenger irrespective of differences in the build of the passenger.

The vehicle airbag device of the twelfth aspect exhibits the excellent advantageous effect of being able to get the coupling portion to effectively approach the femur area of the passenger.

The vehicle airbag device of the thirteenth aspect exhibits the excellent advantageous effect of being able to anchor the left-right pair of rear tethers to the left-right pair of front-rear extension portions, and of also being able to maintain the strength of the airbag, using a simple configuration.

The vehicle airbag device of the fourteenth aspect exhibits the excellent advantageous effect of being able to raise the strength of the airbag.

The passenger protection device of the fifteenth aspect exhibits the excellent advantageous effect of being able to achieve both easy deployment of the airbag installed to the vehicle seat, and stability of restraint of the passenger seated in the vehicle seat.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
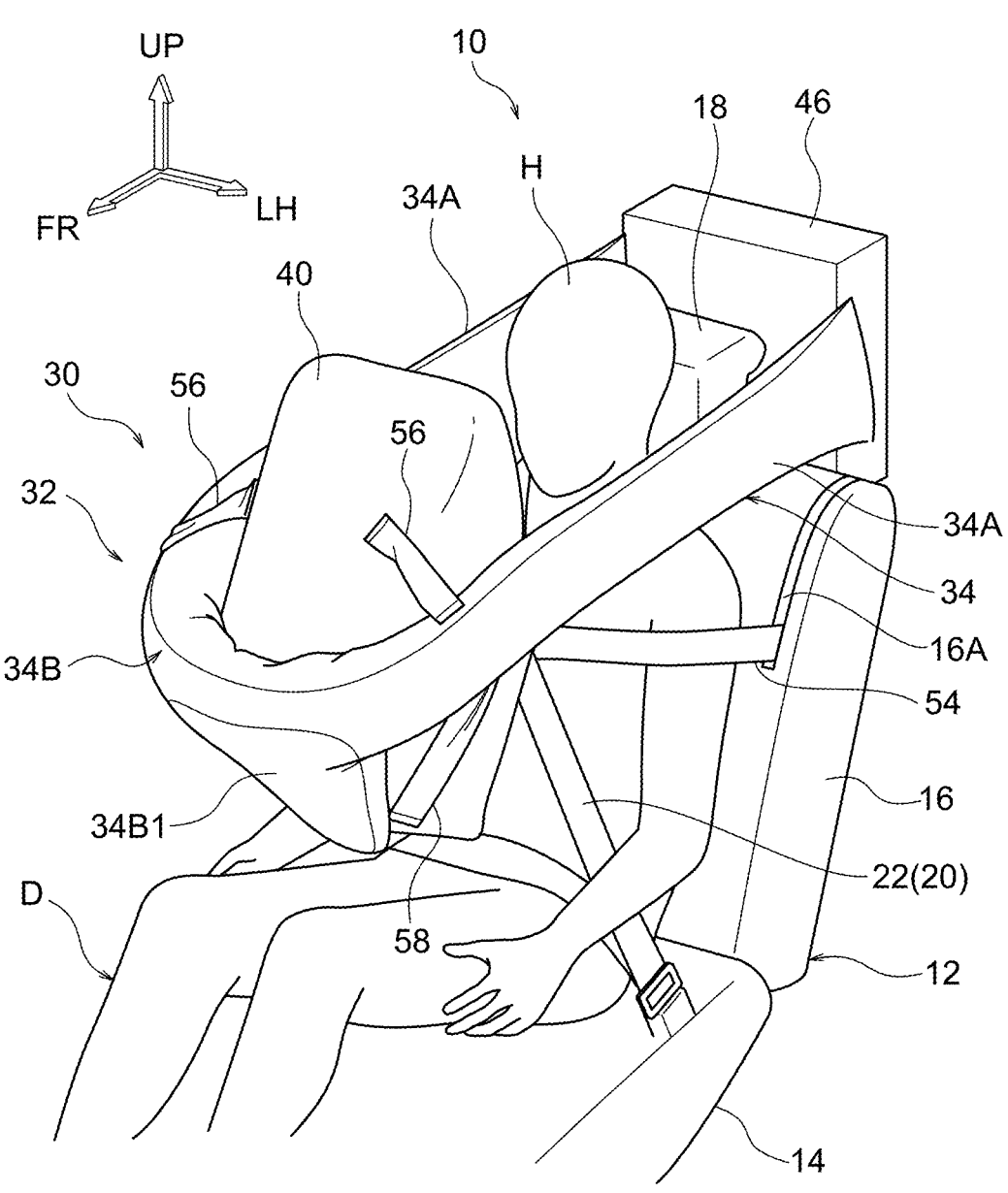
FIG. 1 is a perspective view of a passenger protection device according to a first exemplary embodiment in an expanded and deployed state of an airbag.

Explanation follows regarding a passenger protection device 10 according to a first exemplary embodiment of the present disclosure, with reference to FIG. 1 to FIG. 13. Note that for clarity in the drawings, sometimes some reference numerals are omitted in the drawings. Moreover, as appropriate in the drawings an arrow FR indicates a forward direction (progression direction) of a vehicle, an arrow UP indicates an upward direction thereof, an arrow LH indicates a left direction thereof, and an arrow RH indicates a right direction thereof. In the following, unless explicitly stated otherwise, reference simply to front and rear, left and right, and up and down directions indicate front and rear in a vehicle front-rear direction, left and right in a vehicle left-right direction, and up and down in a vehicle height direction.

As illustrated in FIG. 1 to FIG. 5, the passenger protection device 10 is configured by a vehicle seat 12 and a vehicle airbag device 30. The vehicle seat 12 is a front seat or a rear seat of a vehicle (automobile). The vehicle seat 12 includes a seat cushion 14, a seatback 16 upstanding at an upper side of a rear end portion of the seat cushion 14, and a headrest 18 coupled to an upper end portion of the seatback 16. The front-rear, left-right, and height directions of the vehicle seat 12 are aligned with the vehicle front-rear, left-right, and height directions.

Note that in FIG. 1 to FIG. 5, a crash test dummy person D is illustrated in a seated state on the seat cushion 14 of the vehicle seat 12, as a model of a passenger (seated person) to be protected. The dummy person D is, for example, an America male adult 50 percentile (AM50) head-on collision test dummy (Hybrid III). The dummy person D is seated in a standard seated posture as determined by crash test method, and the vehicle seat 12 is positioned at a standard set position corresponding to the seated posture. For ease of explanation, the dummy person D is hereafter called "passenger D".

The passenger D seated on the seat cushion 14 of the vehicle seat 12 is configured so as to be restrained in the vehicle seat 12 by a seatbelt 22 (see FIG. 1 to FIG. 3; omitted in the drawings of FIG. 4 and FIG. 5) provided to a seatbelt device 20. The seatbelt device 20 is a three-point seatbelt device, and is a so-called seat-mounted seatbelt device in which a non-illustrated retractor and anchor, and a buckle (not appended with a reference numeral), are each provided to the vehicle seat 12.

Figure 9:
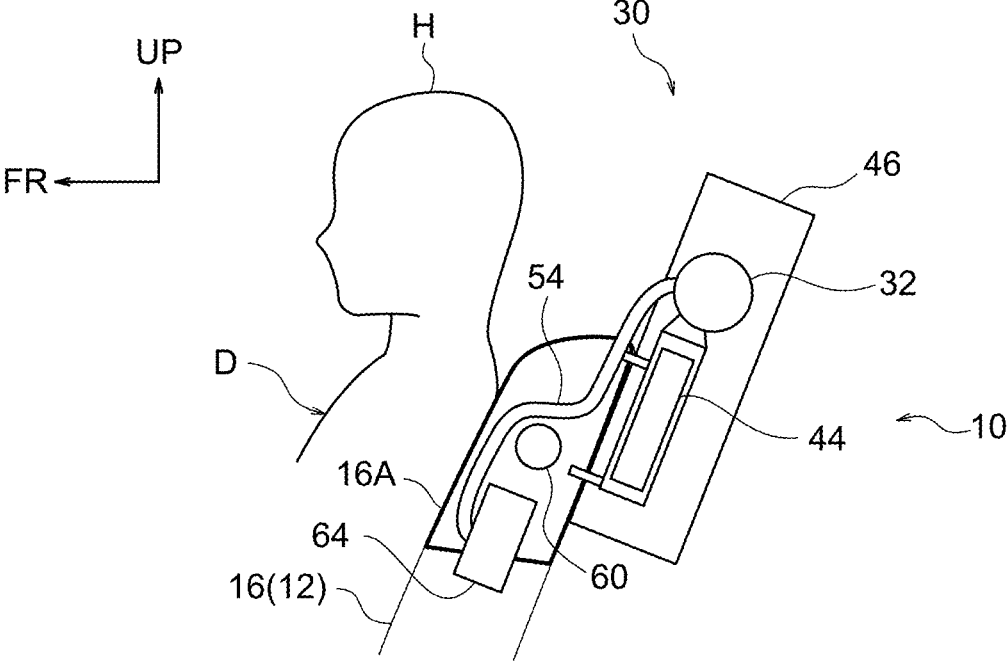
FIG. 9 is a side cross-section of a vicinity of an upper section of a seatback illustrating a state prior to the airbag of FIG. 1 expanding and deploying.

As illustrated in FIG. 9, the airbag device 30 includes an airbag 32, a pair of inflators 44, and a module case 46. The airbag 32 is normally housed in a packed state inside the module case 46, together with the pair of inflators 44. The module case 46 is formed in a hollow cuboidal shape. The module case 46 is disposed to the rear of an upper section of the vehicle seat 12 (more precisely, at an upper end portion of the seatback 16 and to the rear of the integral headrest 18), and is fixed to the upper end portion of the seatback 16 or to a non-illustrated vehicle body.

The airbag 32 is configured so as to expand and deploy (deploy and expand) from a rear side of an upper section of the vehicle seat 12 to the front side thereof on receipt of gas supplied from the pair of inflators 44. The airbag 32 includes a front-rear chamber 34 and an airbag body 40. The front-rear chamber 34 includes a left-right pair of front-rear extension portions 34A that expand and deploy to the front side past the left and right sides of the head H of the passenger D, and includes a coupling portion 34B that links front end portions of the pair of front-rear extension portions 34A together in the left-right direction. The airbag body 40 is configured to expand and deploy at the rear side of the coupling portion 34B toward the passenger D side (rearward) with a delay with respect to the front-rear chambers 34.

Figure 6:
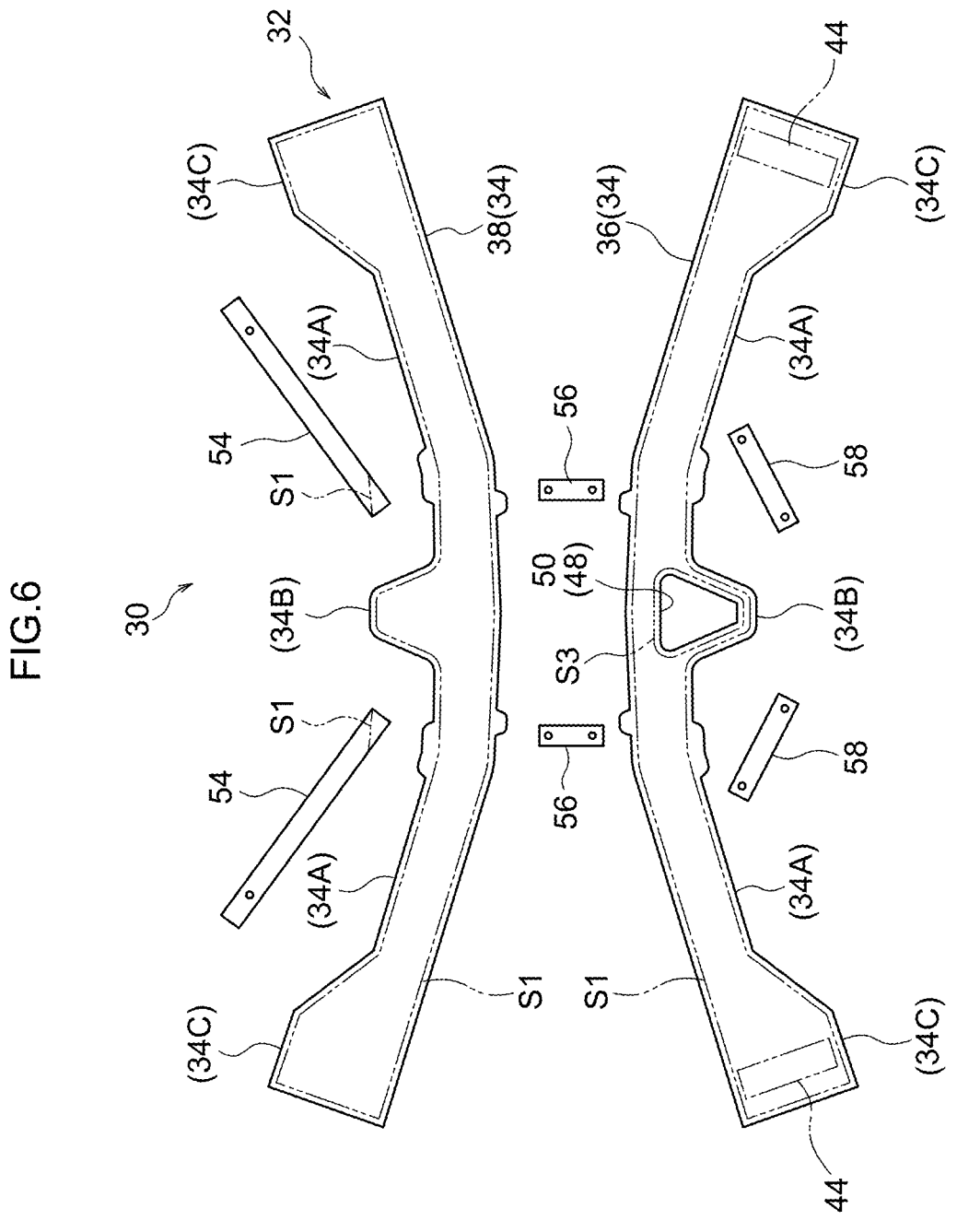
FIG. 6 is an opened-out diagram of the front-rear chamber illustrated in FIG. 1.
Figure 7:
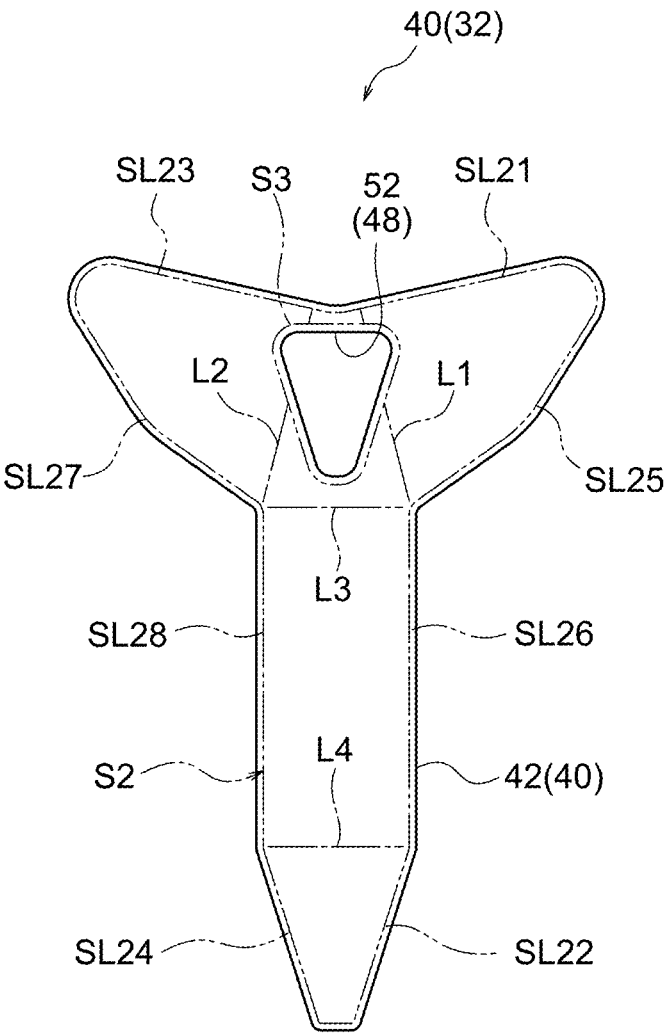
FIG. 7 is an opened-out diagram of the airbag body illustrated in FIG. 1.

The front-rear chamber 34 is formed in an elongated bag shape by superimposing two elongated pieces of base cloth 36, 38 illustrated in FIG. 6 on each other and sewing peripheral edge portions thereof together at a sewn portion S1 as a peripheral edge sewn section. The airbag body 40 is formed in a bag shape by fold-bending a single sheet of base cloth 42 illustrated in FIG. 7 along four fold lines L1, L2, L3, L4, and sewing along sewn portion S2. At the sewn portion S2, sew line SL21 and sew line SL22 are sewn together, sew line SL23 and sew line SL24 are sewn together, sew line SL25 and sew line SL26 are sewn together, and sew line SL27 and sew line SL28 are sewn together. The base cloths 36, 38, 42 illustrated in FIG. 6 and FIG. 7 are, for example, configured by a nylon or polyester fabric material. One or other or both of the two sheets of base cloth 36, 38 configuring the front-rear chamber 34 is/are configured by a base cloth that is more inelastic than the base cloth 42 configuring the airbag body 40.

Figure 8:
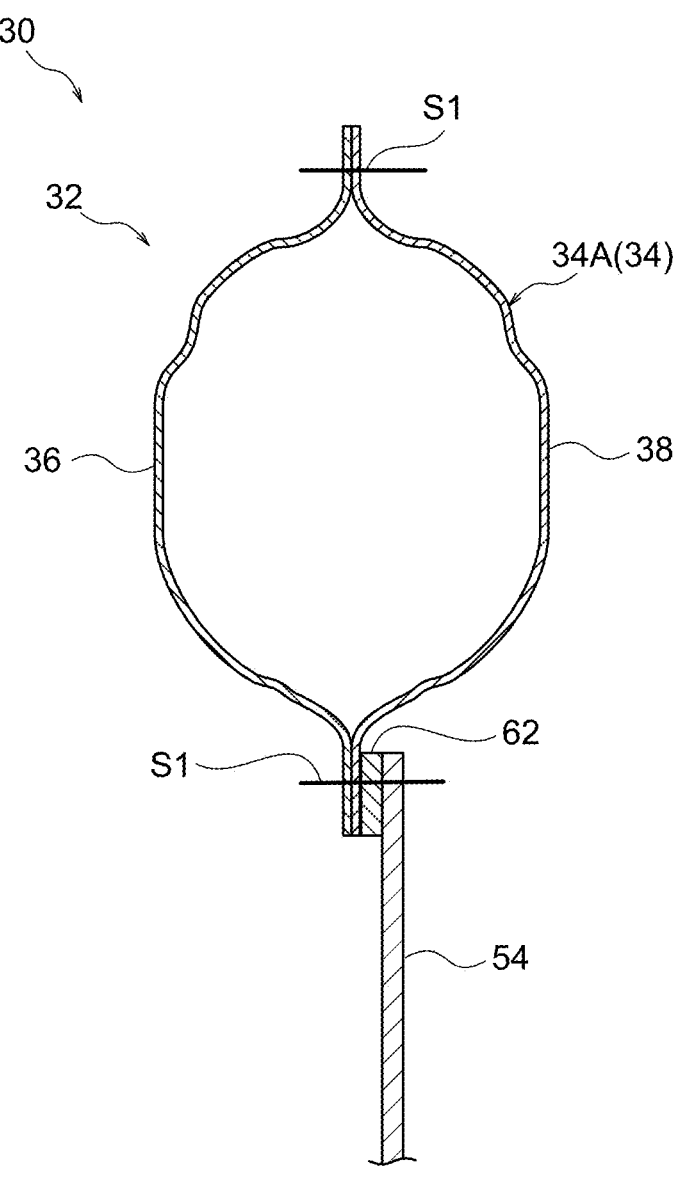
FIG. 8 is an enlarged cross-section taken along line 8-8 of FIG. 2.

As illustrated in FIG. 6, the two length direction end portions of the front-rear chamber 34 are configured as a left-right pair of inflator housing portions 34C for housing the pair of inflators 44. A length direction central portion of the front-rear chamber 34 is configured as the coupling portion 34B, and respective front-rear extension portions 34A are configured between the coupling portion 34B and the pair of inflator housing portions 34C. As illustrated in FIG. 6 and FIG. 8, each of the pair of front-rear extension portions 34A is respectively formed in an elongated tube shape.

As illustrated in FIG. 6, the coupling portion 34B is formed as a substantially T-shaped bag in communication with each of the front-rear extension portions 34A. The coupling portion 34B is sewn to the airbag body 40 at a sewn portion S3 (see FIG. 6 and FIG. 7) provided at a central portion of the coupling portion 34B. The sewn portion S3 is, as an example, formed in a substantially inverted pyramid shape. A communication hole 48 is formed at the inside of the sewn portion S3 to communicate the inside of the coupling portion 34B with the inside of the airbag body 40. The communication hole 48 is, as an example, formed in a substantially inverted pyramid shape. The communication hole 48 is configured by a through hole 50 formed in the base cloth 36 of the front-rear chamber 34, and by a through hole 52 formed in the base cloth 42 of the airbag body 40.

The pair of inflators 44 are cylinder inflators either of a combustion type or cold gas type, and generate gas on being actuated. These inflators 44 are actuated under control by a non-illustrated control device, and generate gas during a vehicle collision.

FIG. 9 illustrates a side cross-section of a vicinity of an upper section of the seatback 16 prior to the airbag 32 being expanded and deployed. The pair of inflator housing portions 34C (see FIG. 6) housing the pair of inflators 44 are arranged inside the module case 46 separately on the left and right sides. Each of the inflators 44 is disposed with an axial direction orientated along the height direction of the seatback 16. An upper-lower pair of stud bolts is, for example, provided to each of the inflators 44. The pair of stud bolts pass through the inflator housing portions 34C, the module case 46, and the frame of the seatback 16, and a nut is screwed onto each of the stud bolts. The inflator housing portions 34C, the inflators 44, and the module case 46 are thereby fixed to the frame of the seatback 16.

The airbag 32 is normally housed inside the module case 46 packed in a specific packed state, such as rolled or concertina folded state. Gas is generated inside the pair of inflator housing portions 34C when the pair of inflators 44 is actuated.

Figure 10:
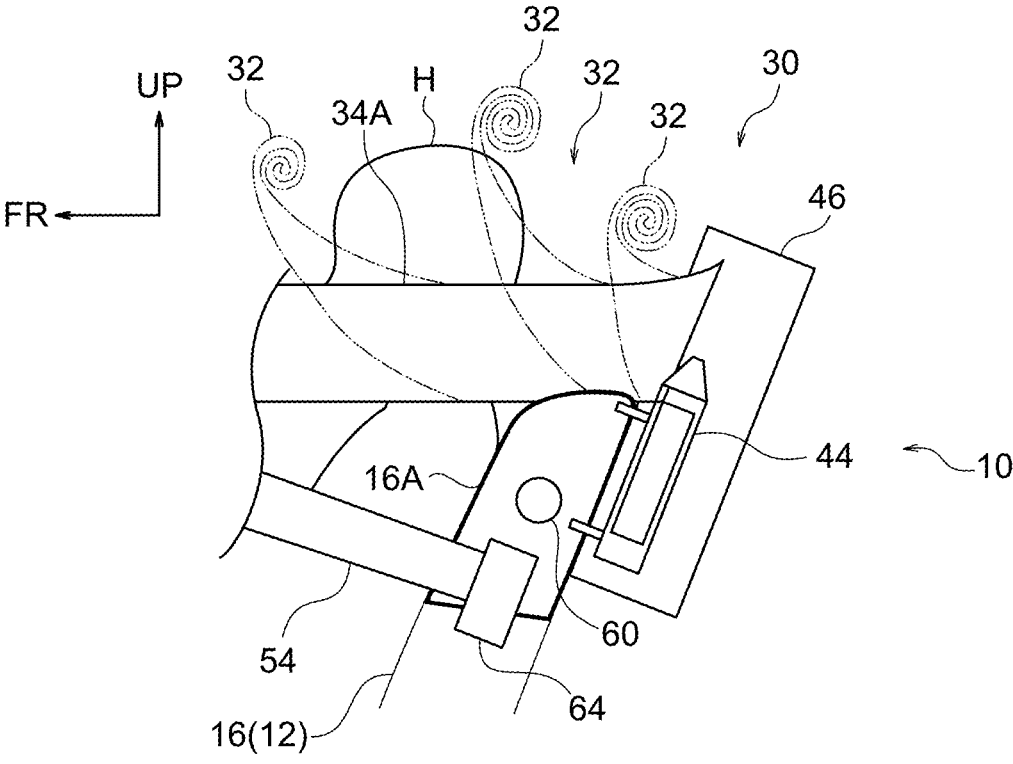
FIG. 10 is a side cross-section of a vicinity of an upper section of a seatback illustrating a state immediately after the airbag of FIG. 1 has completed expanding and deploying.
Figure 11:
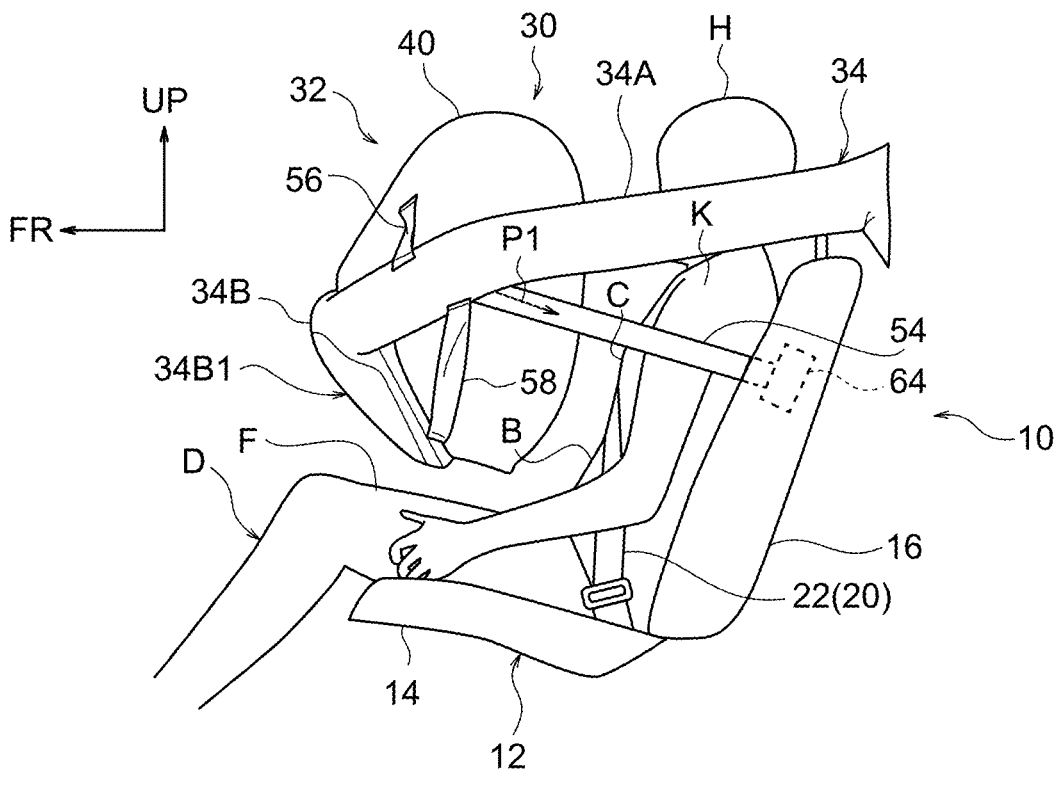
FIG. 11 is a side view illustrating a state immediately after the airbag of FIG. 1 has completed expanding and deploying.

As illustrated in FIG. 10 and FIG. 11, the gas generated inside the pair of inflator housing portions 34C flows through the pair of front-rear extension portions 34A toward the coupling portion 34B side, and is supplied into the airbag body 40 through the communication hole 48. The airbag 32 is thereby expanded and deployed in a sequence of the pair of front-rear extension portions 34A, then the coupling portion 34B, and then the airbag body 40. When the airbag 32 is being expanded and deployed, a non-illustrated tear line formed to the module case 46 is configured to receive expansion pressure of the airbag 32 so as to rupture. The airbag 32 is thereby able to expand and deploy outside the module case 46. As illustrated in FIG. 10, configuration is such that the packed airbag body 40 and coupling portion 34B pass through between the head H of the passenger D and a vehicle roof (omitted in the drawings) due to the expansion and deployment of the pair of front-rear extension portions 34A.

Figure 3:
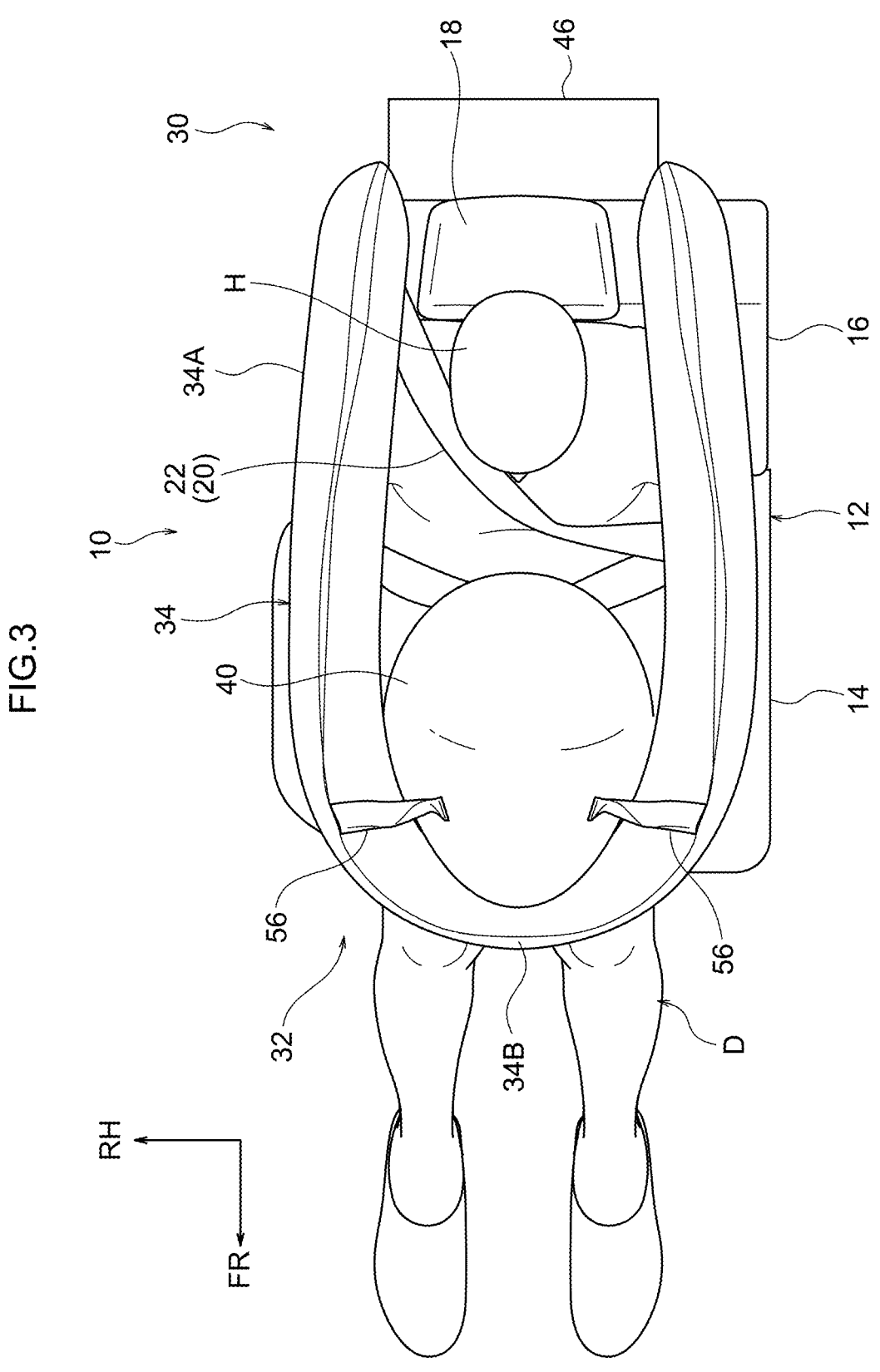
FIG. 3 is a plan view illustrating the configuration illustrated in FIG. 1 in a state viewed from above a vehicle.
Figure 4:
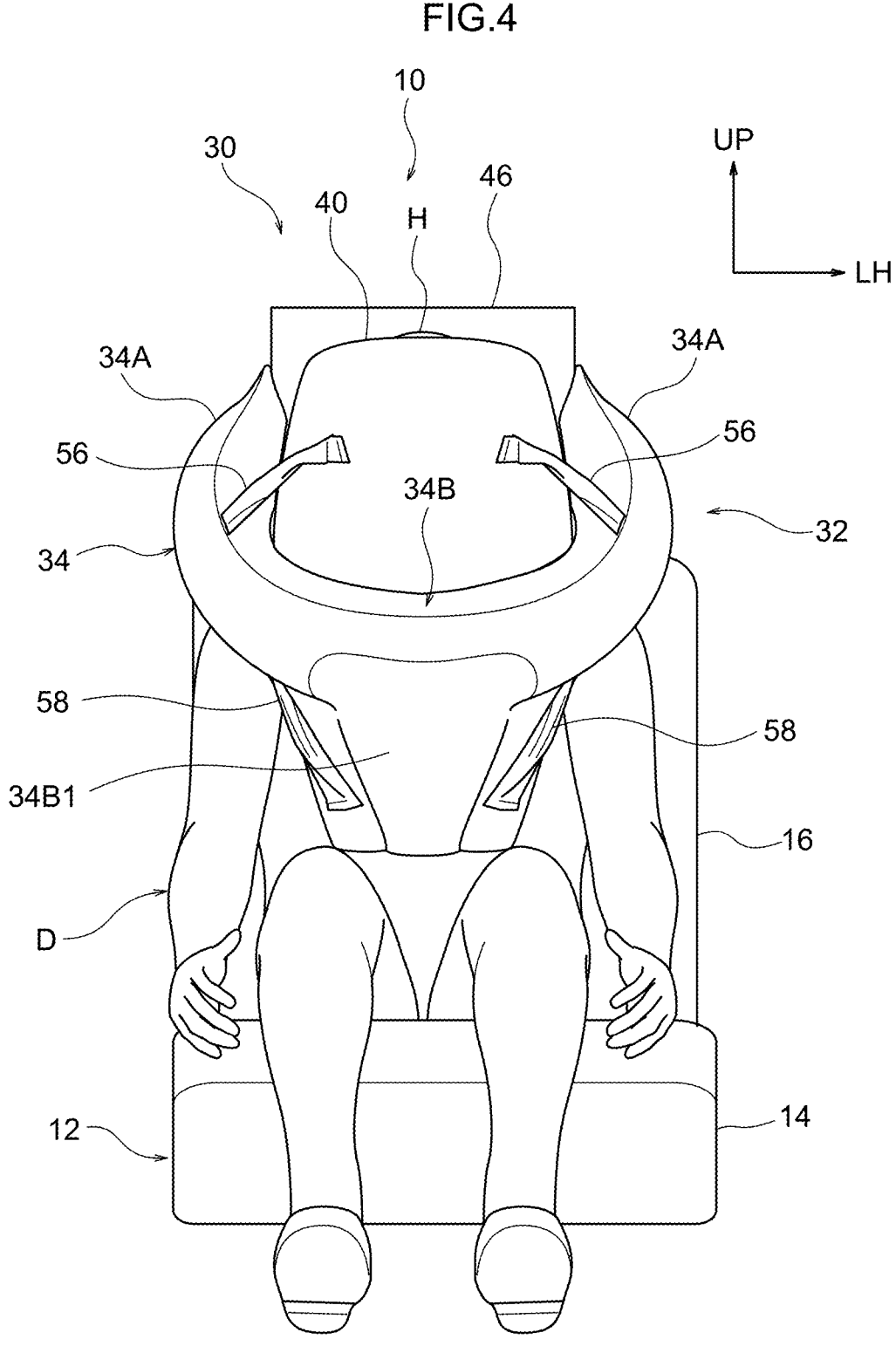
FIG. 4 is a front view illustrating the configuration illustrated in FIG. 1 in a state viewed from a vehicle front side.
Figure 5:
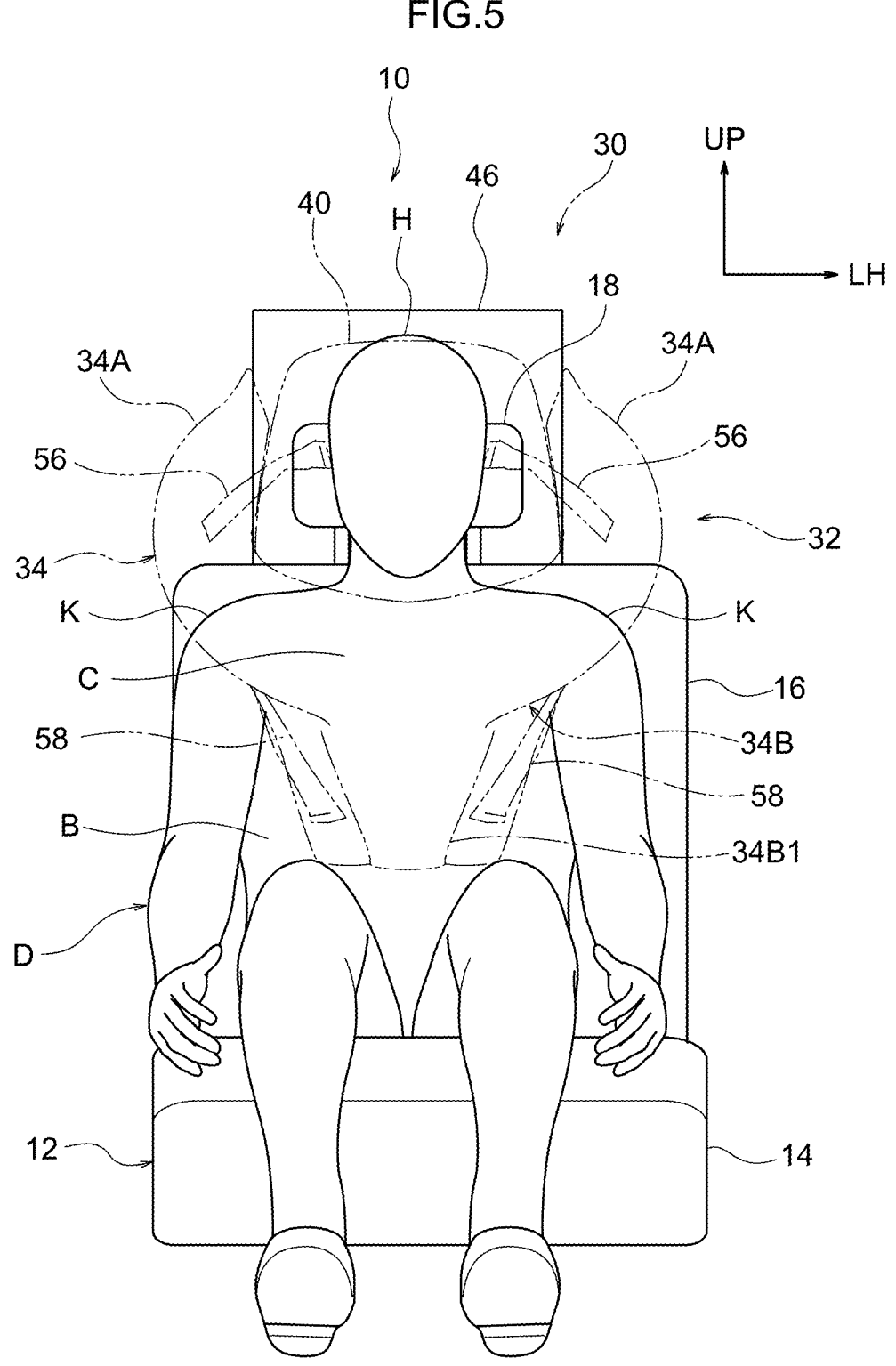
FIG. 5 is a front view illustrating the airbag of FIG. 4 in a see-through state.

As illustrated in FIG. 11, the expanded and deployed pair of front-rear extension portions 34A extend in the front-rear direction at the left and right sides of the head H of the passenger D, and oppose the head H from the left and right sides across a gap. The pair of front-rear extension portions 34A adopt an inclined orientation so as to be lower on progression forward due to being pulled in a diagonally rearward and downward direction by a left-right pair of rear tethers 54, as described later. The front end portions of the expanded and deployed pair of front-rear extension portions 34A adopt a state linked together in the left-right direction by the expanded and deployed coupling portion 34B. As illustrated in FIG. 3, the front-rear chamber 34 including the pair of front-rear extension portions 34A and the coupling portion 34B expand and deploy in a U-shape open toward the rear in plan view.

As illustrated in FIG. 1, FIG. 2, FIG. 4, and FIG. 5, an enlarged portion 34B1 is provided at a left-right direction central portion of the expanded and deployed coupling portion 34B, with the enlarged portion 34B1 having a larger height direction dimension than that of the left right end portions of the coupling portion 34B. The enlarged portion 34B1 projects downward further than the left right end portions of the coupling portion 34B. The communication hole 48 mentioned before (see FIG. 6) is formed in the enlarged portion 34B1. The communication hole 48 is positioned at a rear side of a left-right direction central portion of the expanded and deployed coupling portion 34B. Gas from the inflators 44 is supplied rearward into the airbag body 40 through the communication hole 48. The airbag body 40 is thereby expanded and deployed at the rear of the coupling portion 34B toward the passenger D side (rear side) with a delay from the front-rear chamber 34. The airbag body 40 is expanded and deployed toward the rear side after passing from the rear side toward the front side through a gap between the head H of the passenger D and the vehicle roof (omitted in the drawings) due to the expansion and deployment of the front-rear chamber 34. The expanded and deployed airbag body 40 opposes the head H, the chest area C, and the abdominal area B of the passenger D from the front side, across a gap.

Figure 12:
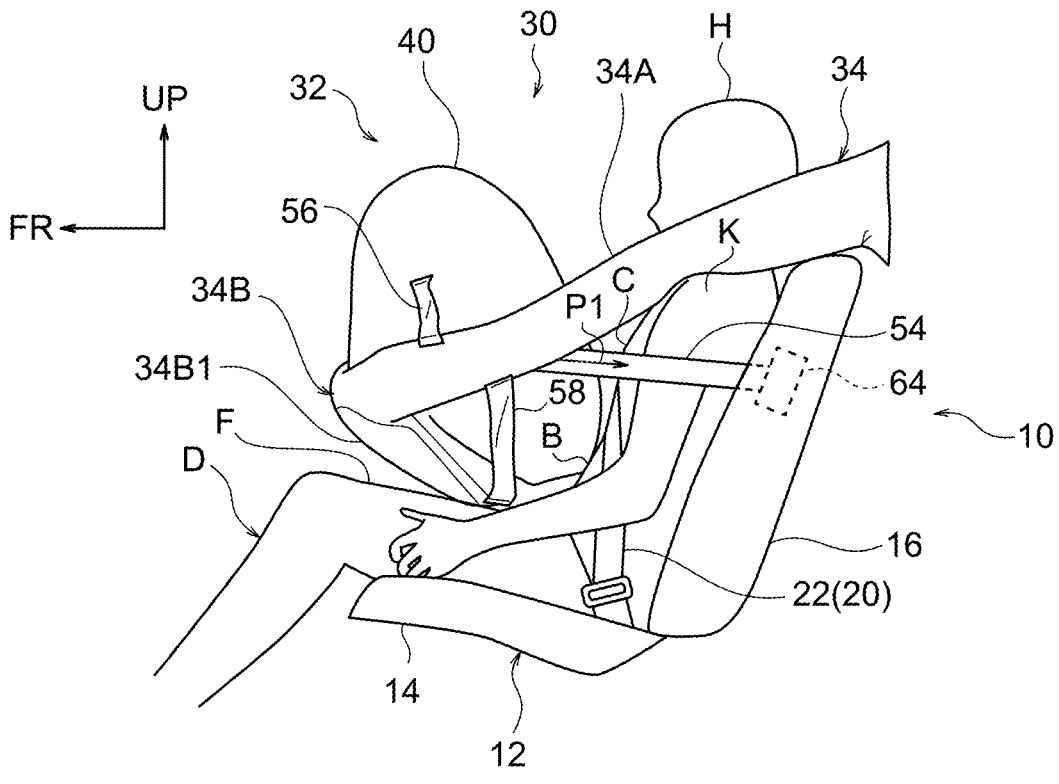
FIG. 12 is a side view illustrating a state at an initial-stage of passenger restraint by the airbag of FIG. 1.
Figure 13:
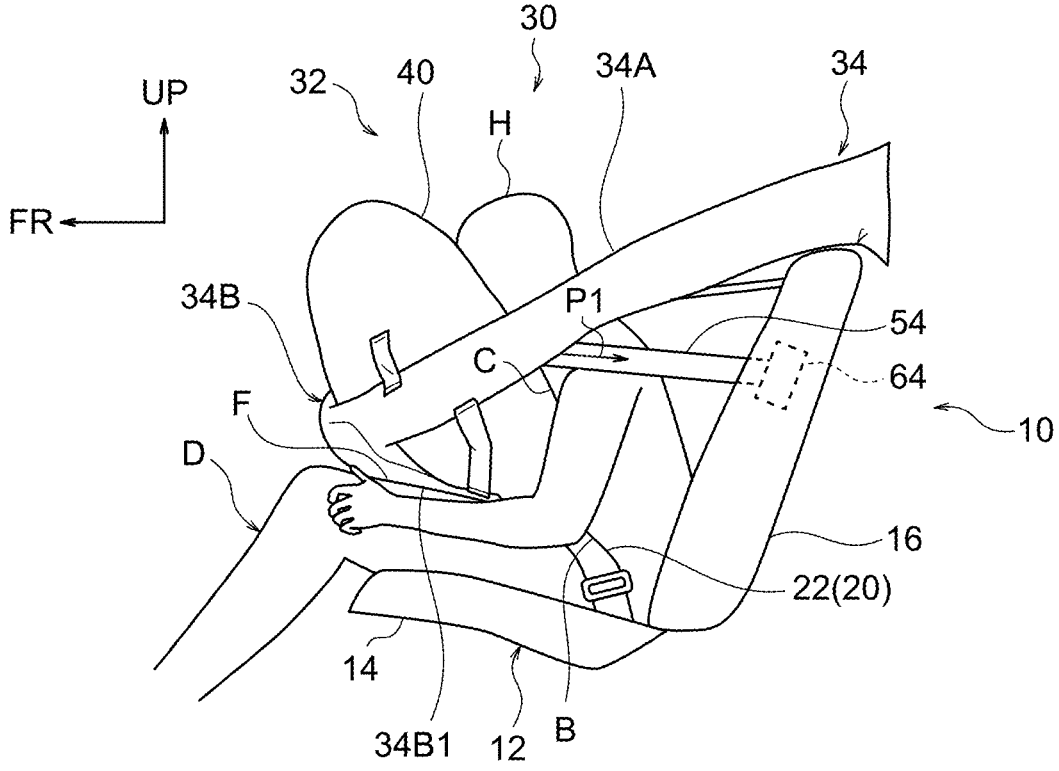
FIG. 13 is a side view illustrating a state at a later-stage of passenger restraint by the airbag of FIG. 1.

As illustrated in FIG. 11 to FIG. 13, the expanded and deployed airbag body 40 restrains the passenger D moving forward under inertia due to impact of a vehicle collision from the front side. During passenger restraint, the front-rear chamber 34 is stretched in the front-rear direction, and the airbag body 40 is compressed in the front-rear direction. The airbag body 40 is set with a shape so as to be sandwiched between the femur area F and the chest area C of the passenger D during passenger restraint, as illustrated in FIG. 12 and FIG. 13.

As illustrated in FIG. 1 to FIG. 4, a left-right pair of rear tethers 54, a left-right pair of front-upper tethers 56, and a left-right pair of front-lower tethers 58 are attached to the airbag 32. The rear tethers 54, the front-upper tethers 56, and the front-lower tethers 58 are, for example, configured with elongated strap shapes from nylon or polyester fabric material.

Figure 2:
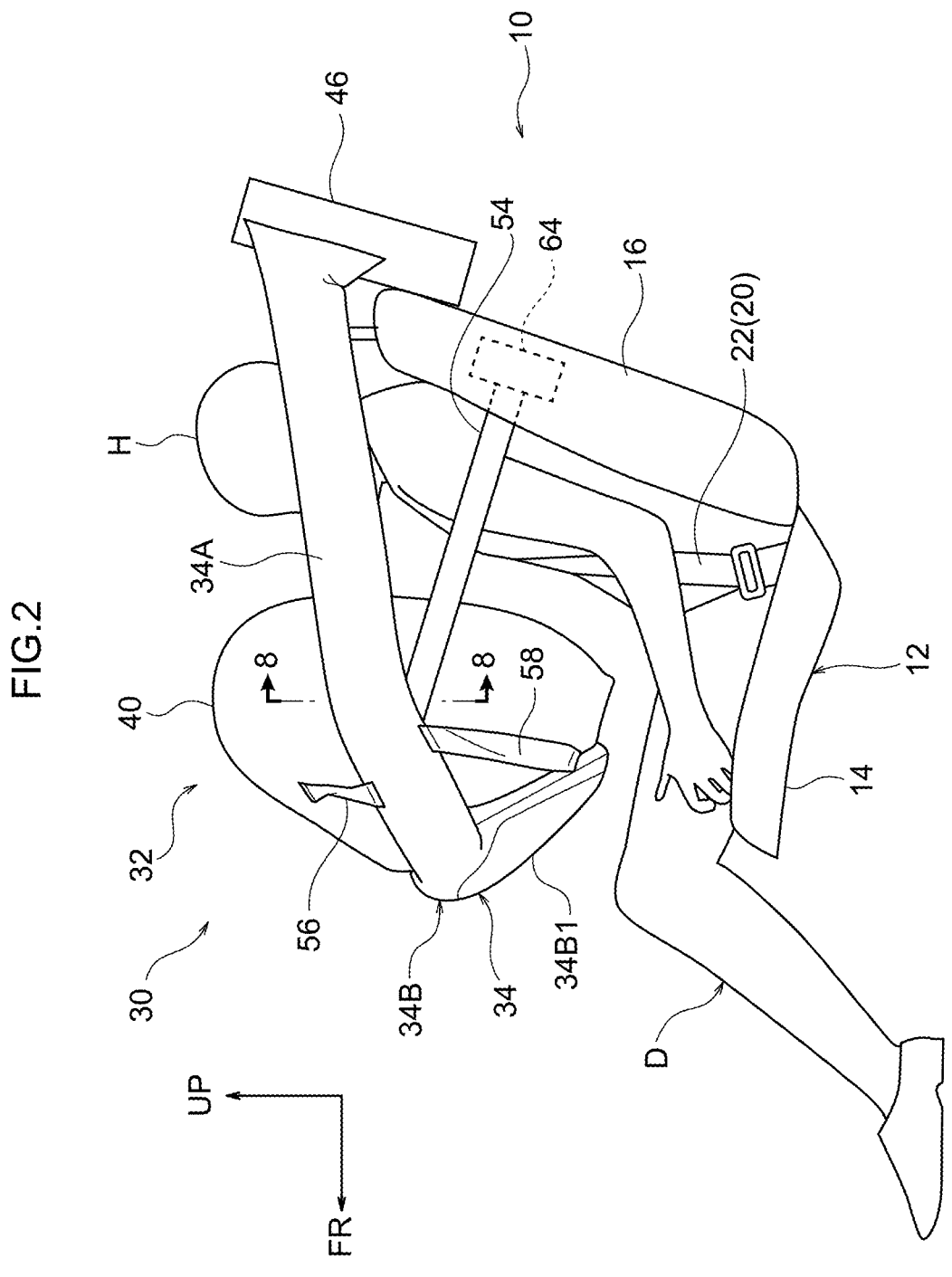
FIG. 2 is a side view illustrating the configuration illustrated in FIG. 1 in a state viewed from a vehicle left side.

One-end portions of the pair of rear tethers 54 are respectively anchored to length direction central portions of the pair of front-rear extension portions 34A. More precisely, as illustrated in FIG. 2 and FIG. 8, the one-end portions of the pair of rear tethers 54 are, at a position overlapping in seat side view with the airbag body at completion of expansion and deployment respectively sewn, together with a reinforcement cloth 62, to front portions of the pair of front-rear extension portions 34A at a portion of the sewn portion S1. Note that the airbag 32 may omit the reinforcement cloth 62. The airbag 32 may also be provided with plural reinforcement cloths. Furthermore, for example, each of the one-end portions of the pair of rear tethers 54 may be sewn to an extension portion configured with a larger width than other seam allowance portions of the front-rear chamber 34.

As illustrated in FIG. 11, a pair of pre-tensioner mechanisms 64 are provide to the seatback 16. The pair of pre-tensioner mechanisms 64 are left-right symmetrically provided to the left and right side portions of the seatback 16. Each of the other-end portions of the pair of rear tethers 54 is anchored to the respective pre-tensioner mechanism 64 in the seatback 16. The pre-tensioner mechanisms are, as an example, each provided with a spool (omitted in the drawings) for taking up the rear tethers 54. Note that the pre-tensioner mechanisms are not limited thereto and may, for example, be mechanisms provided with a cylinder, and a piston that moves inside the cylinder.

As illustrated in FIG. 1, FIG. 9, and FIG. 10, a left-right pair of slits 16A is formed to the seatback 16 extending in the seat height direction. The pair of slits 16A is arranged at the respective seat left-right direction sides of the passenger D. As illustrated in FIG. 9, in a state prior to expansion and deployment of the airbag 32, the respective portions of the pair of rear tethers 54 are inserted into the pair of slits 16A.

A winding portion 60 is respectively provided at an inside portion of the pair of slits 16A, with a length direction intermediate portion of the pair of rear tethers 54 wound thereon from a forward side. These winding portions 60 are fixed to a non-illustrated frame of the seatback 16.

As illustrated in FIG. 10, when the front-rear chamber 34 is being expanded and deployed forward during expansion and deployment of the airbag 32, the pair of rear tethers 54 that have one-end portions respectively sewn to the pair of front-rear extension portions 34A are pulled from inside the pair of slits 16A, and deploy toward the front side. Adopting such a configuration enables the deployment direction of the pair of rear tethers 54 to be restricted by the pair of slits 16A.

In an expanded and deployed state of the airbag 32, the pair of rear tethers 54 extend in the front-rear direction below the pair of front-rear extension portions 34A. In this state, the pair of rear tethers 54 adopt an orientation inclined downward on progression toward the rear. The pre-tensioner mechanisms 64 are configured so as to pull the pair of rear tethers 54 diagonally rearward and downward (see arrow P1 in FIG. 11) after completion of expansion and deployment of the airbag 32, for example after a specific time has elapsed from actuation of the inflators 44 or from detection or prediction of a collision.

A configuration is adopted such that, due to the pair of front-rear extension portions 34A being pulled as described above, a lower face of the pair of front-rear extension portions 34A abuts left and right shoulders K of the passenger D during passenger restraint by the airbag 32 (see FIG. 12 and FIG. 13). The airbag body 40 is supported by tensional load of the pair of front-rear extension portions 34A and the pair of rear tethers 54 during passenger restraint by the airbag 32. Note that in the present exemplary embodiment the passenger D is an AM50, however even in cases in which the passenger D is an America male adult 95 percentile (AM95) or the passenger D is America female adult 5 percentile (AF05), the maximum length of the pair of rear tethers 54 and the pulled-in length of the rear tethers 54 by the pre-tensioner mechanisms 64 are set such that the lower face of the pair of front-rear extension portions 34A abuts the left and right shoulders K of the passenger D.

The pair of front-upper tethers 56 couple left and right side sites of a front portion of an upper section of the airbag body 40 to be expanded and deployed to the upper side of the front-rear chamber 34, and respective front portions of the pair of front-rear extension portions 34A, together. Each of the one-end portions of the pair of front-upper tethers 56 is respectively sewn to left and right side sites at front portions of an upper section of the airbag body 40 to be expanded and deployed further to the upper side than the front-rear chamber 34. Each of the other-end portions of the pair of front-upper tethers 56 is sewn to a front portion of the pair of front-rear extension portions 34A. The pair of front-upper tethers 56 suppress the airbag body 40 from rotating excessively upward about the coupling portion 34B at completion of expansion and deployment of the airbag 32.

The pair of front-lower tethers 58 respectively couple left and right side sites of a lower section of the airbag body 40 to be expanded and deployed further to a lower side than the front-rear chamber 34, and the front portions of the pair of front-rear extension portions 34A, together. Each of the one-end portions of the pair of front-lower tethers 58 is sewn to a respective left and right side site of a lower section of the airbag body 40 to be expanded and deployed further to a lower side than the front-rear chamber 34. Each of the other-end portions of the pair of front-lower tethers 58 is sewn to a respective front portion of the pair of front-rear extension portions 34A. The pair of front-lower tethers 58 suppress the airbag body 40 from rotating excessively downward about the coupling portion 34B at completion of expansion and deployment of the airbag 32.

The airbag device 30 described above includes a non-illustrated control device (electronic control unit (ECU)) to control actuation of the pair of inflators 44. The control device is electrically connected to the pair of inflators 44 and to a non-illustrated collision sensor. The control device is configured so as to be able to, based on information from collision sensors, detect or predict an occurrence of a head-on collision (or the inevitability of a head-on collision) for each collision state, described later, of each type of head-on collision of the vehicle to which it has been applied.

The control device is configured so as to actuate the pair of inflators 44 when a head-on collision is detected or predicted based on information from the collision sensors. Note that states of vehicle head-on collision when the control device actuates the inflators 44 include, in addition to a full head-on collision, offset head-on collisions such as an oblique collision or a small overlap collision or the like.

Moreover, the control device is configured so as to actuate the pre-tensioner mechanisms 64 after completion of expansion and deployment of the airbag 32. For example, the control device actuates the pre-tensioner mechanisms 64 after a specific period of time has elapsed from actuation of the inflators 44. Moreover, the control device may, for example, actuate the pre-tensioner mechanisms 64 after a specific period of time has elapsed from when a collision was detected or predicted.

Operation and Advantageous Effects

Next, description follows regarding operation and advantageous effects of the first exemplary embodiment.

The passenger protection device 10 according to the present exemplary embodiment includes the vehicle seat 12 for the passenger D to sit on, and the airbag device 30 for protecting the passenger D during a vehicle collision. In the airbag device 30, gas generated from the pair of inflators 44 during a vehicle collision is supplied into the airbag 32, and the airbag 32 is expanded and deployed from a seat rear side to a seat front side of an upper section of the vehicle seat 12.

When this occurs, the left-right pair of front-rear extension portions 34A of the front-rear chamber 34 of the airbag 32 expand and deploy toward the seat front side past the left and right sides of the head H of the passenger D seated in the vehicle seat 12. Moreover, in the front-rear chamber 34, the coupling portion 34B, which links the front end portions of the left-right pair of front-rear extension portions 34A together in the seat left-right direction, is expanded and deployed with a delay to the left-right pair of front-rear extension portions 34A. Furthermore, the airbag body 40 expands and deploys at the seat rear side of the coupling portion 34B toward the passenger D side with a delay to the front-rear chamber 34. The airbag body 40 is compressed during restraint of the passenger D so as to be sandwiched between the femur area F and the chest area C of the passenger D while the front-rear extension portions 34A are being stretched in the seat front-rear direction. The kinetic energy when the passenger is moving under inertia is absorbed by compression deformation of the airbag body 40. Moreover, the left-right pair of front-rear extension portions 34A configures a flow path for gas and is also configured so as to bear and support load imparted to the airbag body 40 from the passenger D.

The airbag 32 is coupled to the seatback 16 of the vehicle seat 12 by the left-right pair of rear tethers 54. More precisely, each of the one-end portions of the left-right pair of rear tethers 54 is anchored to the respective left-right pair of front-rear extension portions 34A, and each of the other-end portions thereof is anchored to the pre-tensioner mechanisms 64 provided to the seatback 16. The left-right pair of rear tethers 54 is also configured so as to, together with the front-rear chamber 34, bear and support load imparted to the airbag body 40 from the passenger D.

In particular, in the airbag device 30 according to the present exemplary embodiment, the left-right pair of the pre-tensioner mechanisms 64 provided to the seatback 16 are actuated and the left-right pair of rear tethers 54 are pulled after completion of expansion and deployment of the airbag 32, for example, after a specific period of time has elapsed from actuation of the inflators 44 or from detection or prediction of a collision. During passenger restraint by the airbag 32, the coupling portion 34B accordingly approaches the femur area F of the passenger D due to the left-right pair of the front-rear extension portions 34A being pulled relatively in a seat diagonally rearward and downward direction by the left-right pair of the rear tethers 54. When this occurs, the airbag body 40 that has been expanded and deployed at the seat rear side of the coupling portion 34B rotates so as to tilt toward the seat front side. The airbag body 40 thereby enters deeply between the femur area F and the chest area C of the passenger D, increasing the contact surface area between the passenger D and the airbag body 40. Rising up of the airbag body 40 is suppressed thereby.

Suppose that a length of the rear tethers 54 is too short at the beginning and end, then there would be a concern regarding the airbag 32 being pulled downward during expansion and deployment, interfering with the head H of the passenger D, and regarding the airbag 32 being unable to pass between the head H and the vehicle roof (omitted in the drawings). On the other hand, if the length of the rear tethers 54 is too long at the beginning and end, then although this would facilitate the airbag 32 passing above the head of the passenger D during expansion and deployment, there would be a concern regarding the airbag body 40 rising up during passenger restraint and a decrease in the contact surface area between the passenger D and the airbag 32, and there would be a concern that the airbag 32 might escape to the upper side of the head of the passenger D.

In contrast thereto, in the airbag device 30 according to the present exemplary embodiment, the rear tethers 54 are pulled by the pre-tensioner mechanisms 64 after completion of expansion and deployment of the airbag 32. The length of the left-right pair of rear tethers 54 in the vehicle front-rear direction during passenger restraint by the airbag 32 is accordingly shorter than the length of the left-right pair of rear tethers 54 during expansion and deployment of the airbag 32. This means that, while the maximum length of the rear tethers 54 is set long enough to easily pass above the head of the passenger D during expansion and deployment of the airbag 32, the rear tethers 54 are pulled by the pre-tensioner mechanisms 64 after completion of expansion and deployment of the airbag 32, and so this enables the airbag 32 to be easily deployed while also at the same time achieving stability in the restraint of the passenger D.

Moreover, in the airbag device 30 according to the present exemplary embodiment, due to the left-right pair of rear tethers 54 being pulled by the left-right symmetrically provided pair of pre-tensioner mechanisms 64, swaying of the airbag 32 at completion of expansion and deployment can be effectively suppressed with good balance in both the seat height direction and the seat front-rear direction.

Furthermore, in the airbag device 30 according to the present exemplary embodiment, the airbag body 40 at completion of expansion and deployment opposes the head H, the chest area C, and the abdominal area B of the passenger D from the front side across a gap. This means that the airbag body 40 is expanded and deployed without interfering with the head H, the chest area C, and the abdominal area B of the passenger D. Moreover, during restraint of the passenger D by the airbag body 40, the upper body of the passenger D, including the head H, the chest area C, and the abdominal area B of the passenger D, is able to contact the airbag body 40 over a wide surface area, with this enabling a good reduction in load imparted to the passenger D from the airbag body 40.

Furthermore, in the airbag device 30 according to the present exemplary embodiment, the lower face of the left-right pair of front-rear extension portions 34A abut the left and right shoulders K of the passenger D due to the left-right pair of front-rear extension portions 34A being pulled during passenger restraint in a seat diagonally rearward and downward direction by the left-right pair of rear tethers 54. The seat height direction position of the airbag body 40 can accordingly be stabilized with respect to the head H of the passenger D, irrespective of differences in build of the passenger D.

Moreover, in the airbag device 30 according to the present exemplary embodiment, the left-right pair of rear tethers 54 are connected to the front portions of the left-right pair of front-rear extension portions 34A at a position overlapping in seat side view with the airbag body 40 at completion of expansion and deployment, and the coupling portion 34B is accordingly able to more effectively approach the femur area F of the passenger D.

Furthermore, in the airbag device 30 according to the present exemplary embodiment, the left-right pair of front-rear chambers 34 is formed in a bag shape by the peripheral edge portions of the two superimposed pieces of base cloth being sewn along the sewn portion S1, the left-right pair of the rear tethers 54 are respectively sewn to the left-right pair of the front-rear extension portions 34A at a portion of the sewn portion S1. The left-right pair of rear tethers 54 can accordingly be anchored to the left-right pair of front-rear extension portions 34A with a simpler configuration than cases in which the left-right pair of rear tethers 54 are sewn to the left-right pair of front-rear extension portions 34A at a separate position to the sewn portion S1. Moreover, the strength of the portions of the left-right pair of the rear tethers 54 sewn to the left-right pair of the front-rear extension portions 34A can be raised by the reinforcement cloth 62.

Supplementary Description of First Exemplary Embodiment

In the first exemplary embodiment described above a case has been described in which the pre-tensioner mechanisms 64 are provided inside the left and right side portions of the seatback 16, however there is no limitation thereto, and the pre-tensioner mechanism may be provided to portions outside the seatback. For example, the pre-tensioner mechanism may be fixed to the left and right side faces of the seatback. Such cases eliminate the need for slits in the seatback.

First Modified Example

Figure 14:
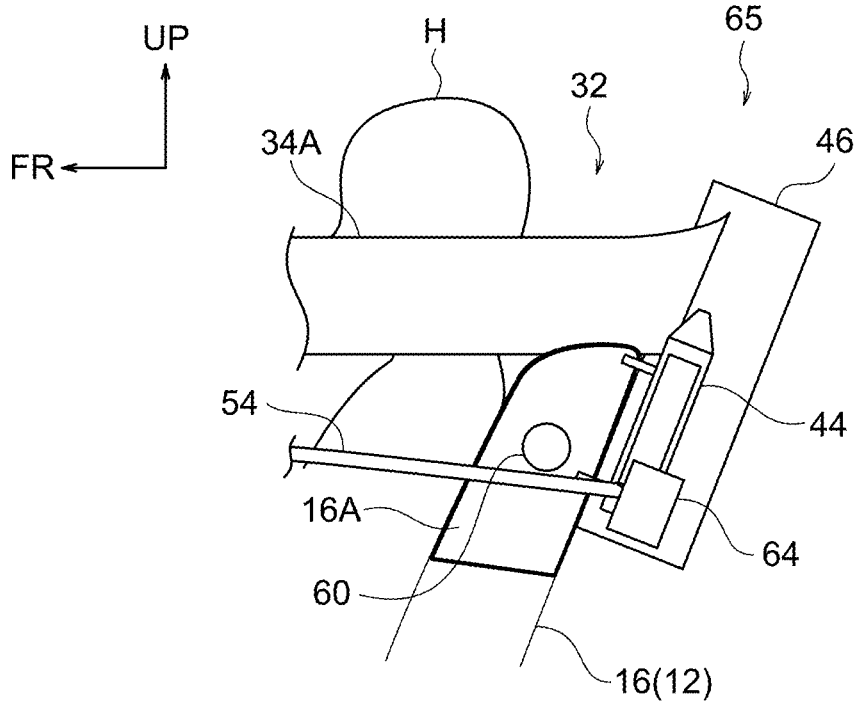
FIG. 14 is a side cross-section of a vicinity of an upper section of a seatback illustrating a state immediately after completion of airbag expansion and deployment in a passenger protection device according to a first modified example of a first exemplary embodiment.

Moreover, the pre-tensioner mechanisms 64 may be provided inside the module case 46 as in a vehicle airbag device 65 according to a first modified example illustrated in FIG. 14. Note that in each of the following modified examples and exemplary embodiments, the same reference numerals are appended to configuration the same as that of the first exemplary embodiment, and explanation thereof will be omitted as appropriate.

In the first modified example, a front-rear chamber 34 expands and deploys forward when an airbag 32 is expanded and deployed, and a pair of rear tethers 54 is pulled from a module case 46 and deployed toward the front side through a pair of slits 16A. Thus similarly to in the first exemplary embodiment, the deployment direction of the pair of rear tethers 54 can be restricted by the pair of slits 16A.

Second Modified Example

Figure 15:
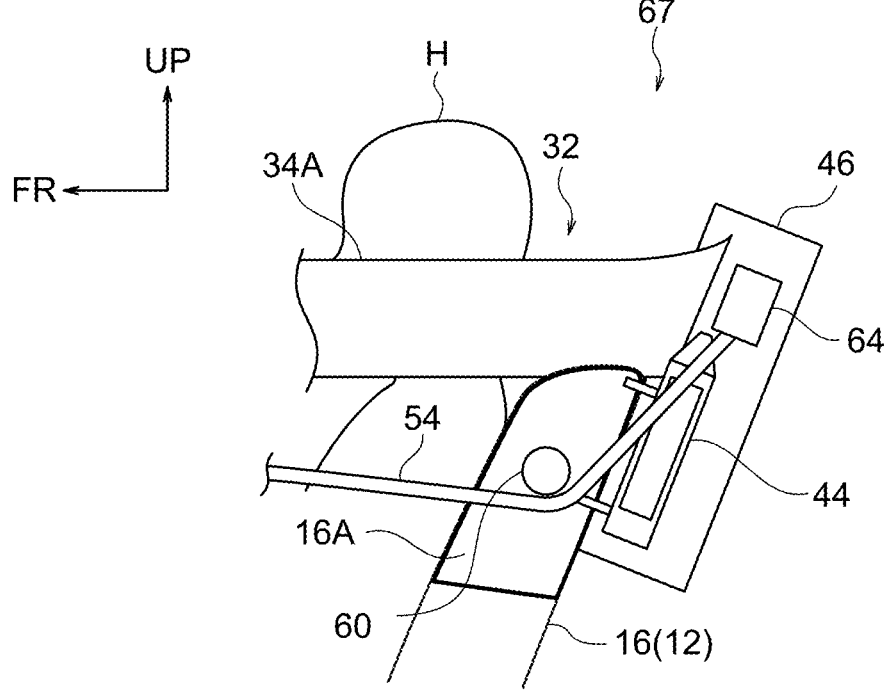
FIG. 15 is a side cross-section of a vicinity of an upper section of a seatback illustrating a state immediately after completion of airbag expansion and deployment in a passenger protection device according to a second modified example of the first exemplary embodiment.

Furthermore, pre-tensioner mechanisms 64 may be fixed to a non-illustrated vehicle body as in a vehicle airbag device 67 according to a second modified example illustrated in FIG. 15. As an example, the pre-tensioner mechanisms 64 may be fixed to a vehicle body at the rear side of the seatback 16 and further to an upper side than inflators 44. Length direction intermediate portions of the pair of rear tethers 54 are wound onto winding portions 60 from the lower side. As illustrated in FIG. 15, in an expanded and deployed state of the airbag 32, the pair of rear tethers 54 are in a fold-bent state at the portions wound onto the pair of winding portions 60. In this embodiment, basically similar operation and advantageous effects are obtained to those of the first exemplary embodiment.

Second Exemplary Embodiment

Figure 16:
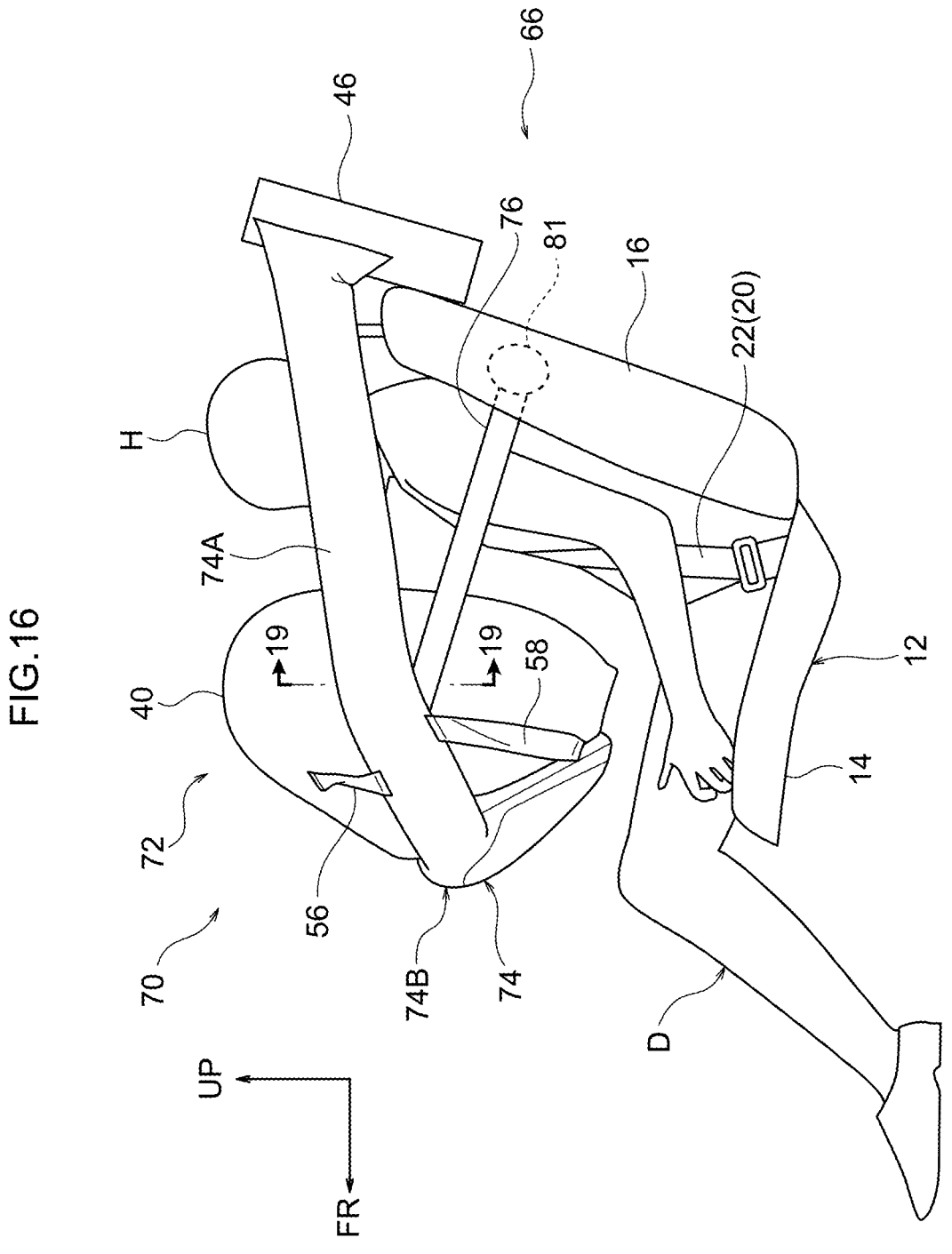
FIG. 16 is a side view illustrating a state in which an airbag has been expanded and deployed in a passenger protection device according to a second exemplary embodiment, as viewed from the vehicle left side.

Description follows regarding a passenger protection device 66 according to a second exemplary embodiment of the present disclosure, with reference to FIG. 16 to FIG. 25. As illustrated in FIG. 16, the passenger protection device 66 is configured including a vehicle seat 12, and a vehicle airbag device 70.

The airbag device 70 includes an airbag 72, a pair of inflators 44 (see FIG. 17), and a module case 46. The airbag 72 is normally housed in a packed state, together with the pair of inflators 44, inside the module case 46.

The airbag 72 expands and deploys (deploys and expands) from a rear side of the upper section of the vehicle seat 12 to the front side thereof on receipt of gas supplied from the pair of inflators 44. The airbag 72 includes a front-rear chamber 74 and an airbag body 40. The front-rear chamber 74 includes a left-right pair of front-rear extension portions 74A that expand and deploy toward the front side past the left and right sides of the head H of the passenger D, and includes a coupling portion 74B that links front end portions of the pair of front-rear extension portions 74A together in the left-right direction. The two length direction end portions of the front-rear chamber 74 are configured as a left-right pair of inflator housing portions 74C (see FIG. 18) for housing the pair of inflators 44. The airbag body 40 is configured to expand and deploy at the rear side of the coupling portion 74B toward the passenger D side (rearward) with a delay from the front-rear chambers 74.

Figure 18:
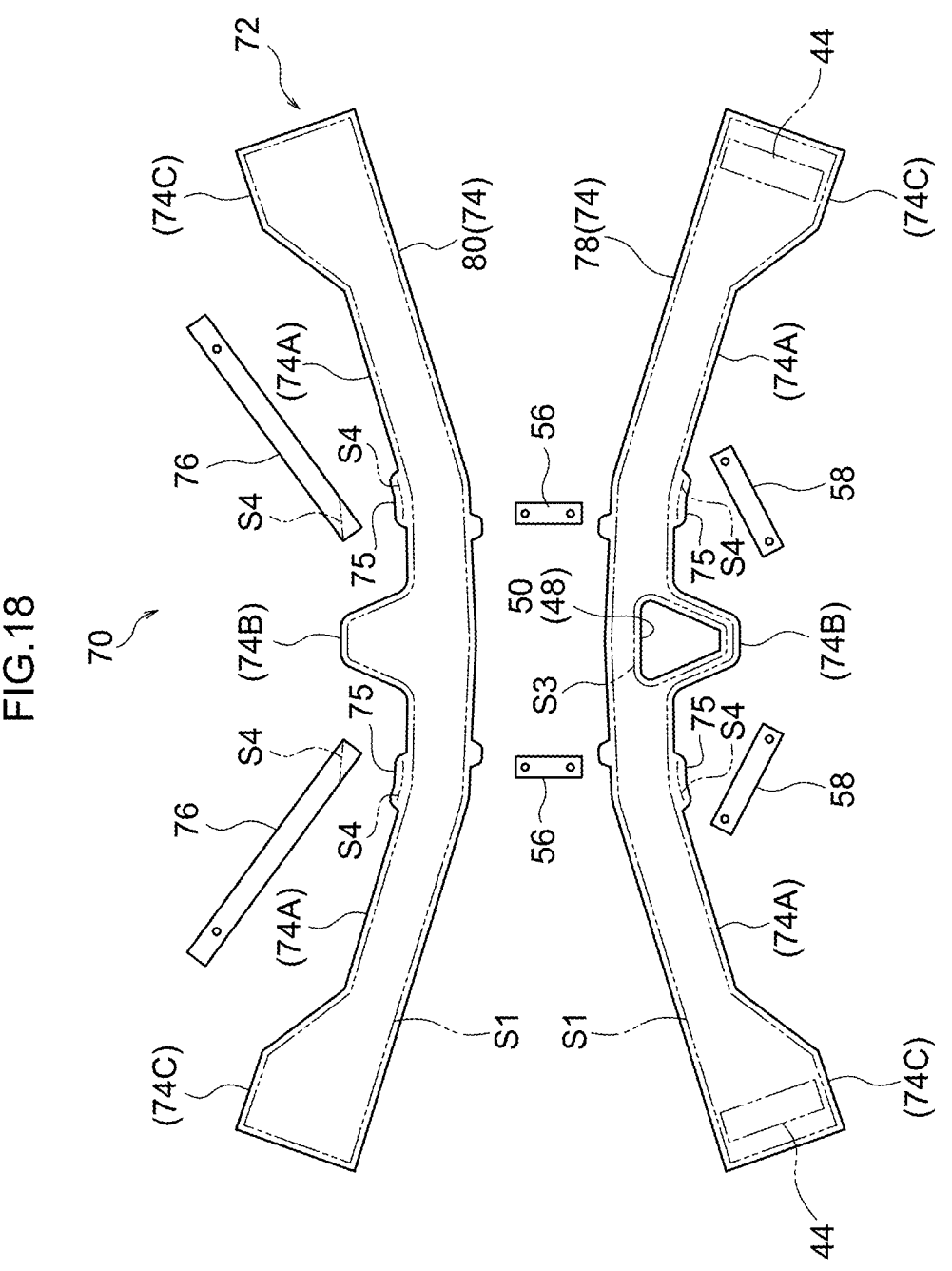
FIG. 18 is an opened-out diagram of the front-rear chamber illustrated in FIG. 16.

The front-rear chamber 74 is formed in an elongated bag shape by superimposing two elongated sheets of base cloth 78, 80 on each other as illustrated in FIG. 18, and sewing peripheral edge portions thereof together at the sewn portion S1. The two sheets of base cloth 78, 80 are configured from a readily extensible nylon fabric material.

As illustrated in FIG. 16, a left-right pair of rear tethers 76, a left-right pair of front-upper tethers 56, and a left-right pair of front-lower tethers 58 are attached to the airbag 72. Each of one-end portions of the pair of rear tethers 76 is respectively anchored to a length direction intermediate portion of the pair of front-rear extension portions 74A. More specifically, each of the one-end portions of the pair of rear tethers 76 is respectively sewn to the pair of front-rear extension portions 74A at a position overlapping in seat side view with the airbag body at completion of expansion and deployment. As illustrated in FIG. 18, the front-rear chamber 74 includes extension portions 75. The extension portions 75 are respectively formed in a substantially trapezoidal shape extending toward a width direction one side of the two sheets of base cloth 78, 80. Each of the one-end portions of the pair of rear tethers 76 is sewn at a sewn portion S4 provided to the extension portion 75. Namely, the respective one-end portions of the pair of rear tethers 76 are sewn to the pair of front-rear extension portions 74A at the sewn portions S4 that are separate from the sewn portion S1 and are provided to the seam allowance for the sewn portion S1. This means that load can be suppressed from acting on the sewn portion S1 when the front-rear extension portions 74A are pulled by the rear tethers 76.

Figure 19:
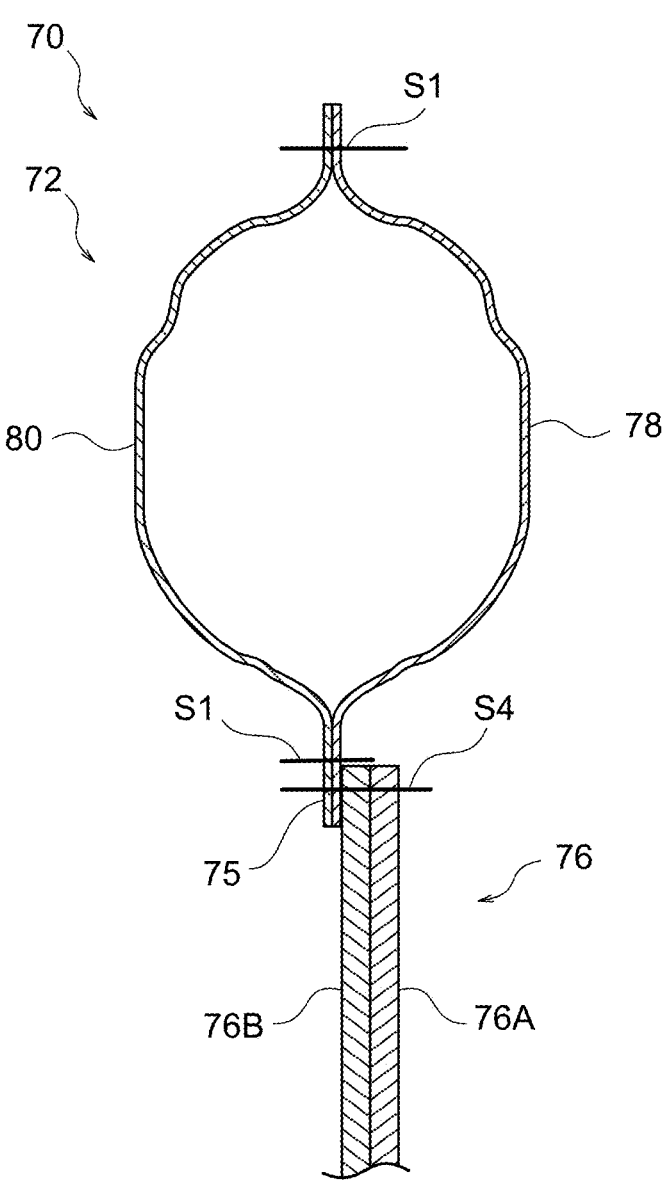
FIG. 19 is an enlarged cross-section taken along line 19-19 of FIG. 16.

As illustrated in FIG. 19, the pair of rear tethers 76 is configured including two elongated strap shaped sheets of fabric material 76A, 76B. The sheets of fabric material 76A, 76B are, for example, configured from inelastic polyethylene terephthalate (PET).

Figure 17:
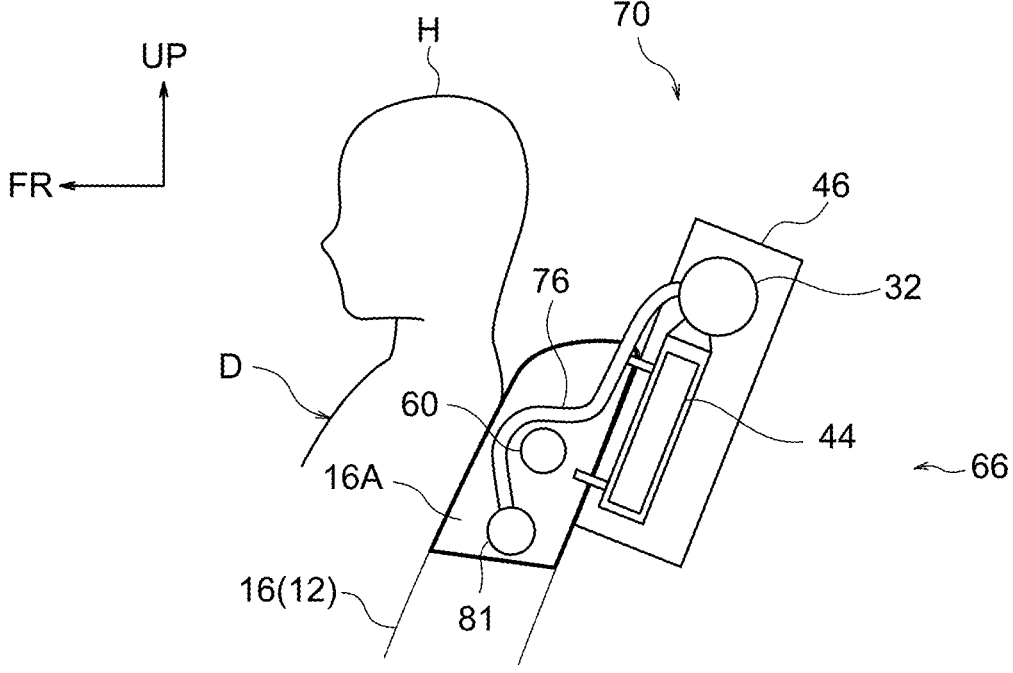
FIG. 17 is a side cross-section of a vicinity of an upper section of a seatback illustrating a state prior to the airbag illustrated in FIG. 16 expanding and deploying.

As illustrated in FIG. 17, the other-end portions of the rear tethers 76 are anchored to a left-right pair of fixing portions 81 provided inside left and right side portions of the seatback 16.

Figure 20:
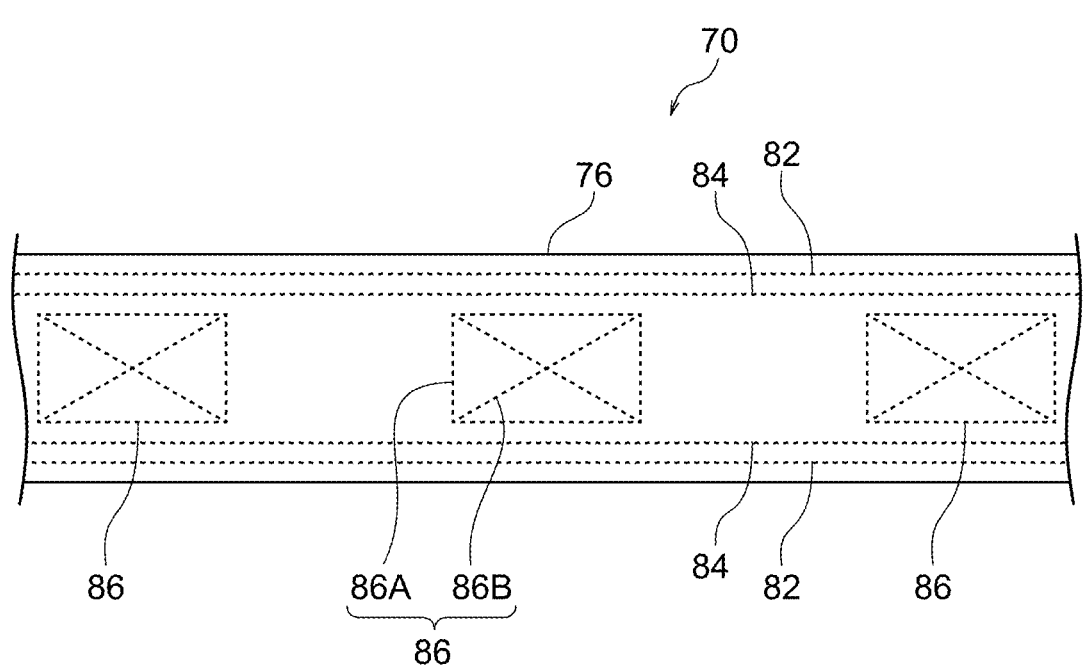
FIG. 20 is an explanatory diagram regarding a reinforcement sewn portion of the rear tether illustrated in FIG. 16.

As illustrated in FIG. 20, the two sheets of fabric material 76A, 76B respectively configuring the pair of rear tethers 76 include the pair of sewn portions 82 sewn in continuous straight lines along a length direction at two short direction end portions of the rear tethers 76, a pair of sewn portions 84 sewn in continuous straight lines along a length direction parallel to the sewn portions 82 at the short direction inside of the rear tethers 76 with respect to the pair of sewn portions 82, and plural sewn portions 86 provided between the pair of sewn portions 84 so as to be spaced apart from each other along the length direction of the rear tethers 76. In the present exemplary embodiment, these sewn portions 82, 84, 86 correspond to reinforcement sewn portions of the present disclosure. The pair of rear tethers 76 are made more inelastic in the length direction by the sewn portions 82, 84, 86.

The plural sewn portions 86 are configured including sewn portions 86A each sewn in a rectangular shape, and X-shaped sewn portions 86B sewn along diagonal lines of the sewn portions 86A. The plural sewn portions 86A are disposed along the length direction spaced at intervals of a dimension either substantially the same as the length direction dimension of each of the sewn portions 86, or at intervals of a larger dimension.

Figure 21A:
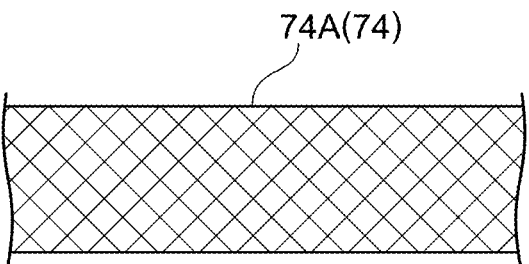
FIG. 21A is an explanatory diagram regarding a grain direction of the front-rear extension portion illustrated in FIG. 16.
Figure 21B:
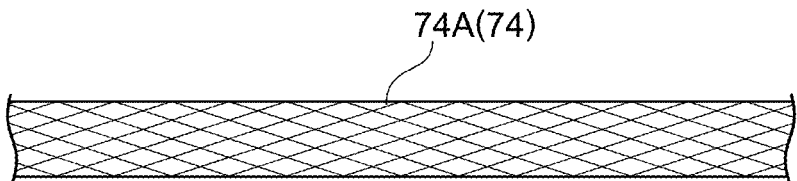
FIG. 21B illustrates a stretched state of the front-rear extension portion illustrated in FIG. 21A.

As illustrated in FIG. 21A, the pair of front-rear extension portions 74A each have a grain angled with respect to the length direction. Thus as illustrated in FIG. 21B, the front-rear extension portions 74A are stretched well when a tensional load acts along the length direction of the front-rear extension portions 74A.

Figure 22A:
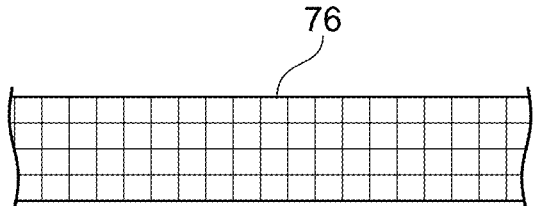
FIG. 22A is an explanatory diagram regarding a grain direction of the rear tether illustrated in FIG. 16.
Figure 22B:
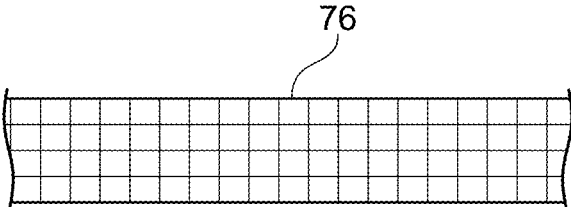
FIG. 22B is a diagram illustrating a stretched state of the rear tether illustrated in FIG. 20A.

However, as illustrated in FIG. 22A, each of the pair of rear tethers 76 has a grain that runs parallel to the length direction thereof. Thus as illustrated in FIG. 22B, the rear tethers 76 hardly extend compared to the pair of front-rear extension portions 74A even when tensional load acts along the length direction of the rear tethers 76. Namely, the pair of rear tethers 76 is more inelastic than the pair of front-rear extension portions 74A due to the respective grain directions.

Operation and Advantageous Effects

Next, description follows regarding operation and advantageous effects of the second exemplary embodiment.

The passenger protection device 66 according to the present exemplary embodiment includes the vehicle seat 12 for the passenger D to sit on, and the airbag device 70 for protecting the passenger D during a vehicle collision. In the airbag device 70, gas generated from the pair of inflators 44 during a vehicle collision is supplied into the airbag 72, and the airbag 72 is expanded and deployed from a seat rear side to a seat front side of an upper section of the vehicle seat 12.

Figure 23:
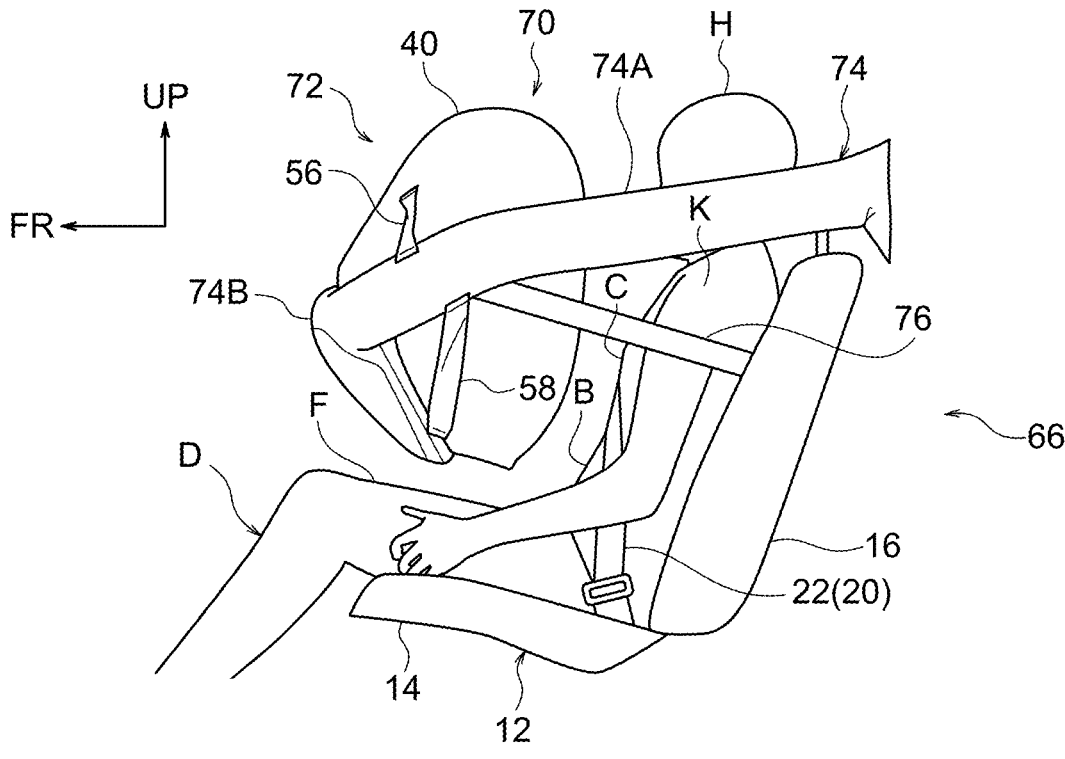
FIG. 23 is a side view illustrating a state immediately after completion of expansion and deployment of the airbag illustrated in FIG. 16.

As illustrated in FIG. 23, the left-right pair of front-rear extension portions 74A of the front-rear chamber 74 of the airbag 72 expand and deploy toward the seat front side past the left and right sides of the head H of the passenger D seated in the vehicle seat 12. Moreover, in the front-rear chamber 74, the coupling portion 74B, which links the front end portions of the left-right pair of front-rear extension portions 74A together in the seat left-right direction, is expanded and deployed with a delay to the left-right pair of front-rear extension portions 74A. Furthermore, the airbag

US 12,589,710 B2

Figure 24:
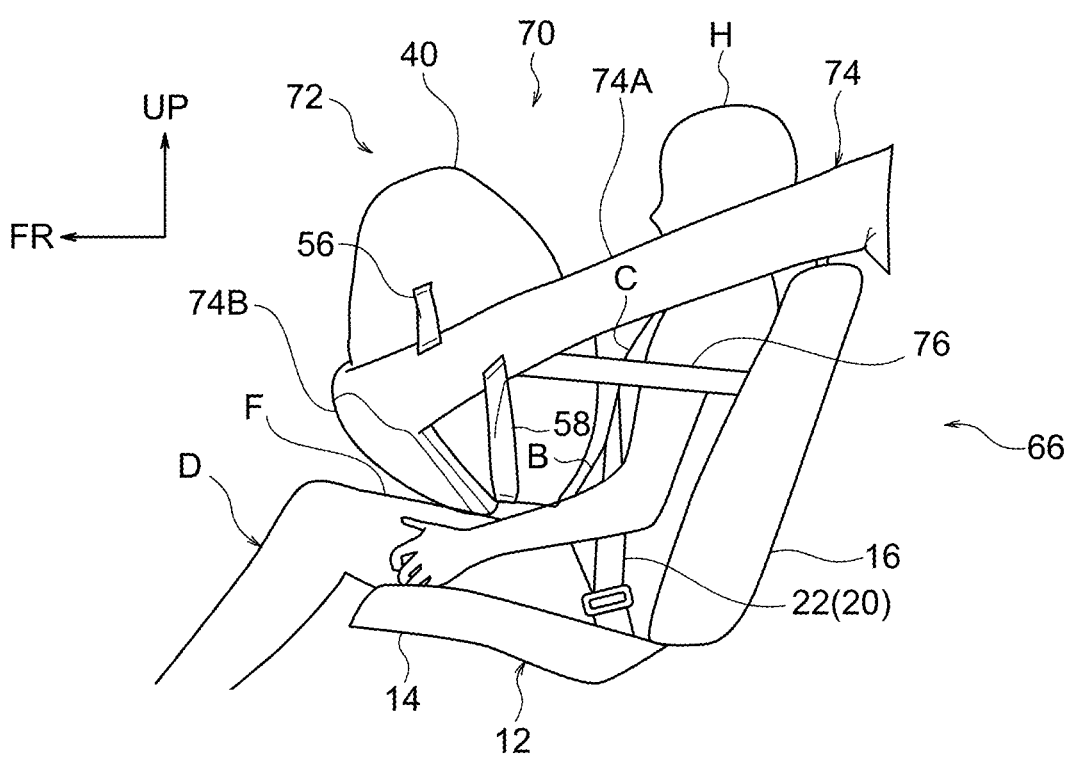
FIG. 24 is a side view illustrating a state at an initial-stage of passenger restraint by the airbag of FIG. 16.
Figure 25:
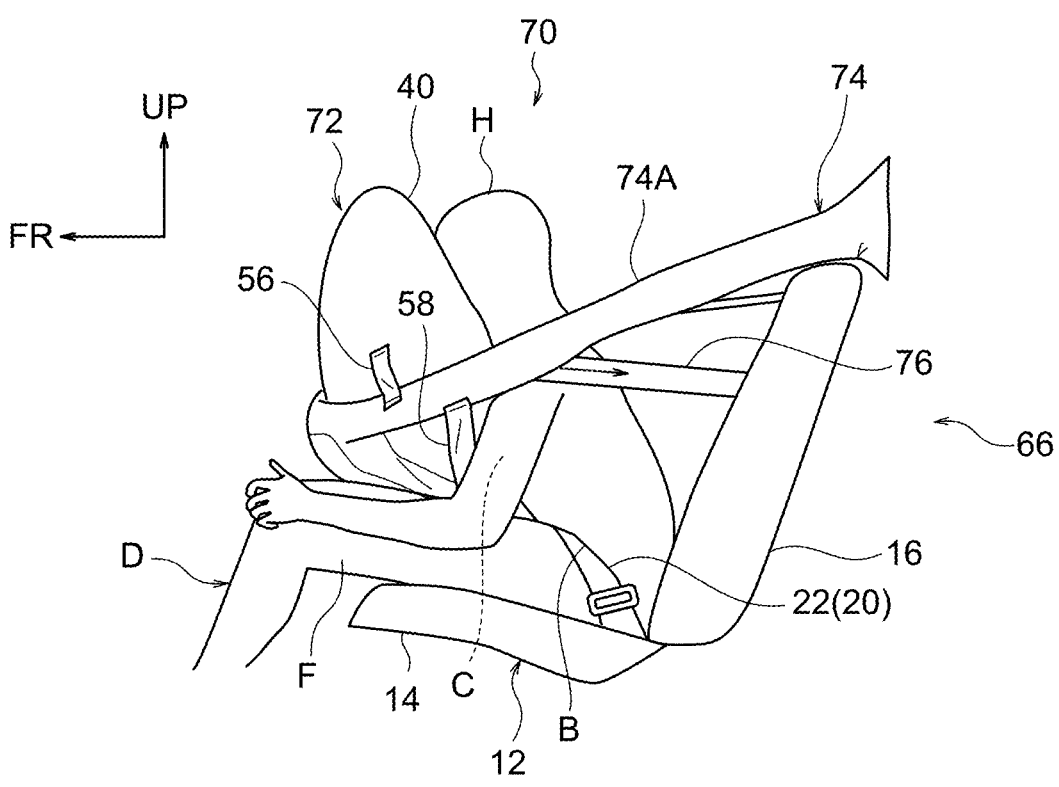
FIG. 25 is a side view illustrating a state at a later-stage of passenger restraint by the airbag of FIG. 16.

19 body 40 expands and deploys at the seat rear side of the coupling portion 74B toward the passenger D side with a delay with respect to the front-rear chamber 74. As illustrated in FIG. 24 and FIG. 25, the airbag body 40 is compressed during restraint of the passenger D by being sandwiched between the femur area F and the chest area C of the passenger D while the front-rear extension portions 74A are being stretched in the seat front-rear direction. The kinetic energy when the passenger D is moving under inertia is absorbed by compression deformation of the airbag body 40. Moreover, the left-right pair of front-rear extension portions 74A configures a gas flow path and is also configured so as to bear and support load imparted to the airbag body 40 from the passenger D.

The airbag 72 is coupled to the seatback 16 of the vehicle seat 12 by the left-right pair of rear tethers 76. More precisely, each of the one-end portions of the left-right pair of rear tethers 76 is respectively anchored to the left-right pair of front-rear extension portions 74A, and each of the other-end portions thereof is anchored to the seatback 16. The left-right pair of rear tethers 76 is also configured so as to, together with the front-rear chamber 74, bear and support load from the passenger D imparted to the airbag body 40.

In particular, in the airbag device 70 according to the present exemplary embodiment, the pair of rear tethers 76 is configured by superimposing the two sheets of fabric material 76A, 76B on each other and sewing together, and so are more inelastic than cases in which they are configured by a single sheet of fabric material. Moreover, the pair of rear tethers 76 is configured so as to be even more inelastic due to being configured from a material that is more inelastic than that of the pair of front-rear extension portions 74A. Furthermore, the pair of respective rear tethers 76 are even more inelastic along the length direction due to at least one portion being sewn with the sewn portions 82, 84, 86 provided along the length direction. Furthermore, in contrast to the pair of front-rear extension portions 74A that each have a grain angled with respect to the length direction, the pair of rear tethers 76 each has a grain direction parallel to the length direction. This means that the pair of rear tethers 76 is even more inelastic in the length direction.

As described above, the pair of rear tethers 76 are inelastic in the length direction, so during passenger restraint by the airbag 72 the coupling portion 74B accordingly approaches the femur area of the passenger due to the pair of the front-rear extension portions 74A being pulled relatively in a seat diagonally rearward and downward direction by the pair of the rear tethers 76. When this occurs, the airbag body 40 that has expanded and deployed at the seat rear side of the coupling portion 74B rotates so as to tilt toward the seat front side. This means that the airbag body 40 enters deeply between the femur area F and the chest area C of the passenger D, increasing the contact surface area between the passenger D and the airbag 32. Rising up of the airbag body 40 is suppressed thereby.

Moreover, the sewn portions 82, 84 are provided continuously along the length direction of the pair of rear tethers 76. Stretching of the pair of rear tethers 76 along the length direction is accordingly effectively suppressed.

Furthermore, there are plural of the sewn portions 86 provided spaced from each other along the length direction of the pair of rear tethers 76. Namely, in the pair of rear tethers there are portions where the sewn portions 86 are provided disposed alternately along the length direction with portions where the sewn portions 86 are not provided. This accordingly facilitates folding of the pair of rear tethers 76, enabling the airbag to be housed compactly.

20

Supplementary Description of Second Exemplary Embodiment

In the second exemplary embodiment described above, a case has been described in which the other-end portions of the pair of rear tethers 76 are respectively anchored to the left-right pair of fixing portions 81 provided inside the left and right side portions of the seatback 16, however there is no limitation thereto. For example, each of the other-end portions of the pair of rear tethers 76 may be anchored to a left-right pair of fixing portions provided to side faces of left and right side portions of the seatback 16. Moreover, the other-end portions of the pair of rear tethers 76 may be anchored to fixing portions provided to a non-illustrated vehicle body.

Moreover, in the second exemplary embodiment described above, a case has been described in which the fabric material 76A and the fabric material 76B of the pair of rear tethers 76 are sewn with the pair of sewn portions 82, the pair of sewn portions 84, and the plural sewn portions 86, however there is no limitation thereto. At least a portion of the rear tethers may be sewn with reinforcement sewn portions of various shapes provided along the length direction.

First Modified Example

Figure 26:
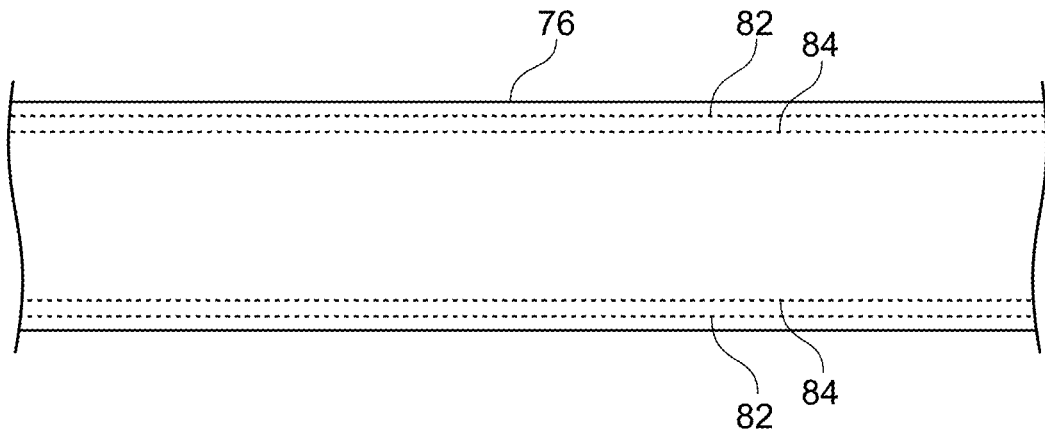
FIG. 26 is an explanatory diagram regarding a reinforcement sewn portion of a rear tether in a passenger protection device according to a first modified example of the second exemplary embodiment.

For example, as in a first modified example illustrated in FIG. 26, the fabric material 76A and the fabric material 76B of the pair of rear tethers 76 may be sewn with the pair of sewn portions 82 and the pair of sewn portions 84 alone.

Second Modified Example

Figure 27:
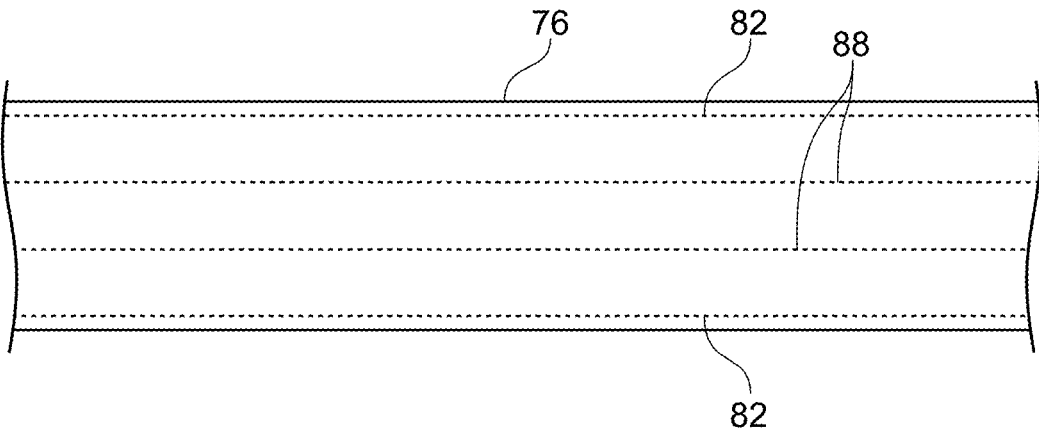
FIG. 27 is an explanatory diagram regarding a reinforcement sewn portion of a rear tether in a passenger protection device according to a second modified example of the second exemplary embodiment.

Moreover, as in a second modified example illustrated in FIG. 27, the fabric material 76A and the fabric material 76B of the pair of rear tethers 76 may be sewn with the pair of sewn portions 82, and with a pair of sewn portions 88 disposed so as to be spaced apart at uniform intervals between the pair of sewn portions 82. Each of the pair of sewn portions 88 is sewn in a continuous straight line along the length direction at a short direction central portion of the rear tethers 76. In the present modified example the pair of sewn portions 82 and the pair of sewn portions 88 (a total of 4 straight lines of sewn portion) are sewn at uniform intervals in the short direction, and so stretching of the rear tethers 76 in the length direction is more effectively suppressed.

Third Modified Example

Figure 28:
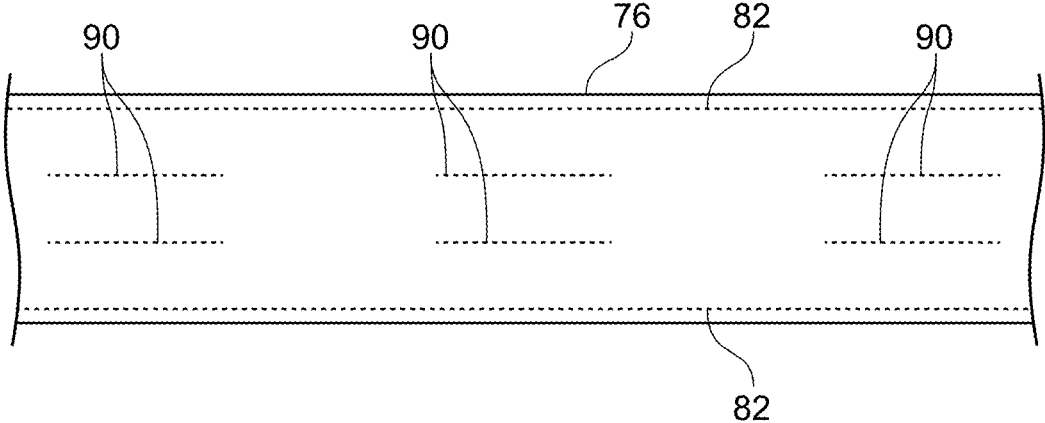
FIG. 28 is an explanatory diagram regarding a reinforcement sewn portion of a rear tether in a passenger protection device according to a third modified example of the second exemplary embodiment.

Furthermore, as in a third modified example illustrated in FIG. 28, the fabric material 76A and the fabric material 76B of the pair of rear tethers 76 may be sewn with the pair of sewn portions 82, and plural pairs of sewn portions 90 configured so as to be disposed at uniform intervals between the pair of sewn portions 82 and provided so as to be spaced apart from each other in the length direction of the rear tethers 76.

Fourth Modified Example

Figure 29:
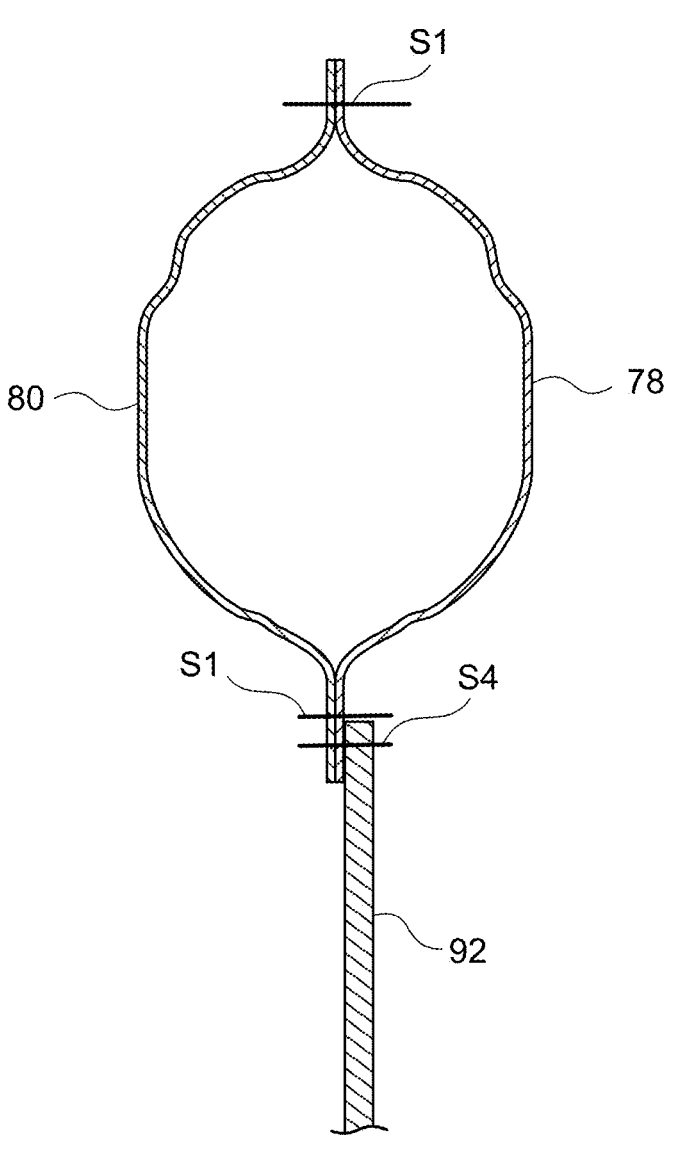
FIG. 29 is a cross-section corresponding to FIG. 19 of a state at completion of expansion and deployment of an airbag in a passenger protection device according to a fourth modified example of the second exemplary embodiment.
Figure 30:
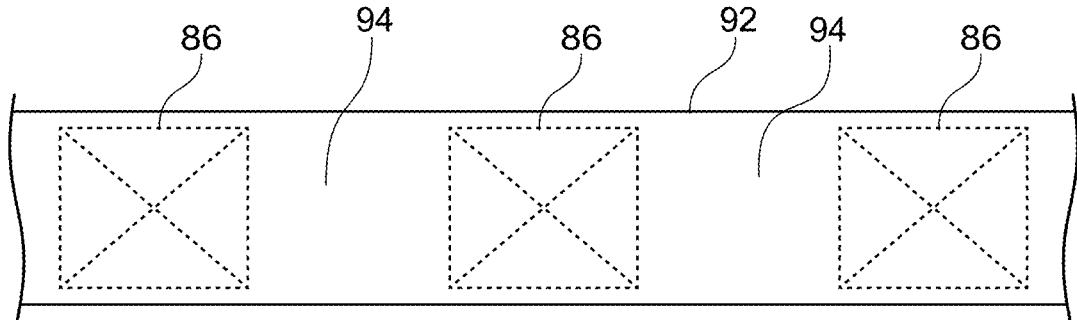
FIG. 30 is an explanatory diagram regarding a reinforcement sewn portion of the rear tether illustrated in FIG. 28.

Furthermore, as in a fourth modified example illustrated in FIG. 29 and FIG. 30, a pair of rear tethers 92 may be respectively configured from a single sheet of fabric material. In the fourth modified example, plural sewn portions 86 are provided to the pair of rear tethers 92 disposed spaced apart from each other along the length direction. In other words, the pair of rear tethers 76 includes non-sewn portions 94 disposed between the plural sewn portions 86 where sewn portions are not provided. The non-sewn portions 94 are easily folded. This means that the pair of rear tethers 92 is even more easily folded.

Fifth Modified Example

Figure 31:
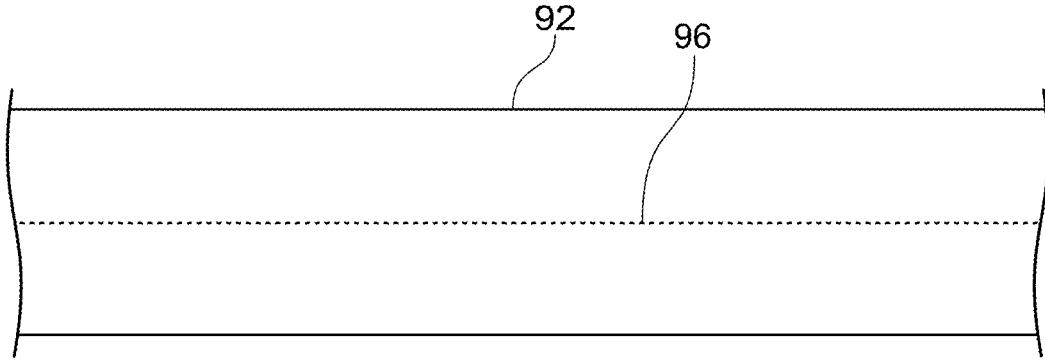
FIG. 31 is an explanatory diagram regarding a reinforcement sewn portion of the rear tether in a passenger protection device according to a fifth modified example of the second exemplary embodiment.

Moreover, as in a fifth modified example illustrated in FIG. 31, a pair of rear tethers 92 each respectively configured from a single sheet of fabric material may be provided with a single sewn portion 96 sewn in a straight line along the length direction at a short direction central portion. In the present modified example, stretching in the length direction of the rear tethers 92 can be suppressed with the simplest configuration.

Supplementary Description of Above Exemplary Embodiments

The first exemplary embodiment and each of the modified examples of the first exemplary embodiment described above have been described for cases in which each of the pair of rear tethers 54 is configured from a single fabric material. Moreover, the second exemplary embodiment and the first to third modified examples of the second exemplary embodiment described above have been described for cases in which each of the pair of rear tethers 76 is configured include the two sheets of fabric material 76A, 76B. Furthermore, the fourth modified example and the fifth modified example of the second exemplary embodiment described above have been described for cases in which each of the pair of rear tethers 92 is configured from a single sheet of fabric material. However, there is no limitation thereto, and any number of sheets of fabric material may be employed to configure the rear tethers. Note that the greater the number of sheets of the fabric material the more inelastic the rear tethers become.

Moreover, the first exemplary embodiment described above has been described for a case of the passenger protection device 10 in which the pair of front-rear extension portions 34A are pulled relatively in a seat diagonally rearward and downward direction by the pair of rear tethers 54 being pulled by the pair of pre-tensioner mechanisms 64. Furthermore, the second exemplary embodiment described above has been described for a case of the passenger protection device 66 in which the pair of front-rear extension portions 74A is pulled relatively in a seat diagonally rearward and downward direction by the inelastically configured rear tethers 76. However there is no limitation thereto, and the passenger protection device may be provided with both pre-tensioner mechanisms and inelastic rear tethers. For example, the rear tethers 54 of the first exemplary embodiment may be exchanged with the rear tethers 76 of the second exemplary embodiment.

The following supplements are also disclosed in relation to the exemplary embodiment described above.

Supplement 1

A vehicle airbag device, comprising:
an inflator that generates gas during a vehicle collision;
an airbag that is supplied with the gas and expands and deploys from a seat rear side to a seat front side of an upper section of a vehicle seat; and
a left-right pair of rear tethers that couple the airbag to a seatback of the vehicle seat or to a vehicle body,

wherein the airbag includes:
a front-rear chamber configured including a left-right pair of front-rear extension portions that expand and deploy toward the seat front side past left and right sides of a head of a passenger seated in the vehicle seat, and a coupling portion that links together, in a seat left-right direction, front end portions at completion of expansion and deployment of the left-right pair of front-rear extension portions, and
an airbag body that expands and deploys at the seat rear side of the coupling portion toward a passenger side with a delay with respect to the front-rear chamber, and that is compressed so as to be sandwiched between a femur area and a chest area of the passenger while the front-rear extension portions are being stretched in a seat front-rear direction during passenger restraint to restrain the passenger; and
wherein the left-right pair of rear tethers is configured such that one-end portions thereof are anchored to the left-right pair of front-rear extension portions, other-end portions thereof are anchored to the seatback or to the vehicle body, and during passenger restraint each of the left-right pair of front-rear extension portions is pulled relatively in a seat diagonally rearward and downward direction such that the coupling portion approaches the femur area of the passenger.

Supplement 2

The vehicle airbag device of claim 1, further comprising a left-right pair of pre-tensioner mechanisms provided at the seatback or at the vehicle body for pulling the left-right pair of rear tethers after completion of expansion and deployment of the airbag.

Supplement 3

The vehicle airbag device of claim 2, wherein the left-right pair of pre-tensioner mechanisms is provided left-right symmetrically at left and right side portions of the seatback.

Supplement 4

The vehicle airbag device of any one of supplement 1 to supplement 3, wherein a coefficient of extension with respect to a length direction of the left-right pair of rear tethers is smaller than a coefficient of extension in a length direction of the left-right pair of front-rear extension portions.

Supplement 5

The vehicle airbag device of supplement 4, wherein the left-right pair of rear tethers is configured from a material more inelastic than the left-right pair of front-rear extension portions.

Supplement 6

The vehicle airbag device of supplement 4 of supplement 5, wherein the left-right pair of rear tethers has a grain direction parallel to a length direction thereof and the left-right pair of front-rear extension portions has a grain direction angled with respect to a length direction thereof.

Supplement 7

The vehicle airbag device of any one of supplement 4 to supplement 6, wherein at least a portion of the left-right pair of rear tethers includes a reinforcement sewn portion sewn along a length direction thereof.

Supplement 8

The vehicle airbag device of supplement 7, wherein the reinforcement sewn portion is provided continuously along the length direction of the left-right pair of rear tethers.

Supplement 9

The vehicle airbag device of claim 7, wherein a plurality of reinforcement sewn portions is provided spaced apart from each other along the length direction of the left-right pair of rear tethers.

Supplement 10

The vehicle airbag device of any one of supplement 1 to supplement 9, wherein the airbag body at completion of expansion and deployment opposes a head, a chest area, and an abdominal area of the passenger from a front side across a gap.

Supplement 11

The vehicle airbag device of any one of supplement 1 to supplement 10, wherein a configuration is adopted such that during restraint of the passenger, a lower face of the left-right pair of front-rear extension portions abuts left and right shoulders of the passenger.

Supplement 12

The vehicle airbag device any one of supplement 1 to supplement 11, wherein each of the one-end portions of the left-right pair of rear tethers is connected to respective front portions of the left-right pair of front-rear extension portions at a position overlapping in a seat side view with the airbag body at the completion of expansion and deployment.

Supplement 13

The vehicle airbag device any one of supplement 1 to supplement 12, wherein:

the left-right pair of front-rear chambers is formed in a bag shape by peripheral edge portions of two sheets of superimposed base cloth being sewn at a peripheral edge sewn section; and each of the left-right pair of rear tethers is respectively sewn to the left-right pair of front-rear extension portions at a portion of the peripheral edge sewn section.

Supplement 14

The vehicle airbag device of supplement 13, wherein the left-right pair of rear tethers are sewn together with a reinforcement cloth to the two sheets of base cloth of the left-right pair of front-rear extension portions at the peripheral edge sewn section.

Supplement 15

A passenger protection device, comprising:

a vehicle seat for a passenger to sit on; and the vehicle airbag device of any one of claim 1 to claim 14 installed at a seat rear side of an upper section of the vehicle seat.

What is claimed is:

1. A vehicle airbag device, comprising:

an inflator that is configured to generate gas during a vehicle collision;

an airbag that is configured to be supplied with the gas and configured to expand and deploy from a seat rear side to a seat front side of an upper section of a vehicle seat; and a left-right pair of rear tethers that couples the airbag to a seatback of the vehicle seat or to a vehicle body, wherein the airbag includes:

a front-rear chamber including a left-right pair of front-rear extension portions that is configured to expand and deploy toward the seat front side past left and right sides of a head of a passenger seated in the vehicle seat, and a coupling portion that links together, in a seat left-right direction, front end portions at completion of expansion and deployment of the left-right pair of front-rear extension portions, and an airbag body that is configured to expand and deploy at the seat rear side of the coupling portion toward a passenger side with a delay with respect to the front-rear chamber, wherein the airbag body is configured to be compressed so as to be sandwiched between a femur area and a chest area of the passenger and contact both the femur area and the chest area of the passenger while the front-rear extension portions are being stretched in a seat front-rear direction during passenger restraint to restrain the passenger, one-end portions of the left-right pair of rear tethers are anchored to the left-right pair of front-rear extension portions, other-end portions of the left-right pair of rear tethers are anchored to the seatback or to the vehicle body, and each of the left-right pair of front-rear extension portions is configured to, during the passenger restraint, be pulled relatively in a seat diagonally rearward and downward direction to cause the coupling portion to approach the femur area of the passenger.

2. The vehicle airbag device of claim 1, further comprising:

a left-right pair of pre-tensioner mechanisms provided at the seatback or at the vehicle body and configured to pull the left-right pair of rear tethers after completion of expansion and deployment of the airbag.

3. The vehicle airbag device of claim 2, wherein the left-right pair of pre-tensioner mechanisms is provided left-right symmetrically at left and right side portions of the seatback.

4. The vehicle airbag device of claim 1, wherein a coefficient of extension with respect to a length direction of the left-right pair of rear tethers is smaller than a coefficient of extension in a length direction of the left-right pair of front-rear extension portions.

5. The vehicle airbag device of claim 4, wherein the left-right pair of rear tethers is configured from a material more inelastic than the left-right pair of front-rear extension portions.

6. The vehicle airbag device of claim 4, wherein the left-right pair of rear tethers has a grain direction parallel to a length direction thereof, and the left-right pair of front-rear extension portions has a grain direction angled with respect to a length direction thereof.

7. The vehicle airbag device of claim 4, wherein at least a portion of the left-right pair of rear tethers includes a reinforcement sewn portion sewn along a length direction thereof.

8. The vehicle airbag device of claim 7, wherein the reinforcement sewn portion is provided continuously along the length direction of the left-right pair of rear tethers.

9. The vehicle airbag device of claim 7, wherein a plurality of reinforcement sewn portions is provided spaced apart from each other along the length direction of the left-right pair of rear tethers.

10. The vehicle airbag device of claim 1, wherein the airbag body at completion of expansion and deployment is configured to oppose the head, the chest area, and an abdominal area of the passenger from a front side across a gap.

11. The vehicle airbag device of claim 10, wherein a lower face of the left-right pair of front-rear extension portions is configured to, during the passenger restraint, abut left and right shoulders of the passenger.

12. The vehicle airbag device of claim 1, wherein each of the one-end portions of the left-right pair of rear tethers is connected to a corresponding front portion of the left-right pair of front-rear extension portions at a position of overlap between the left-right pair of front-rear extension portions and the airbag body at the completion of expansion and deployment of the airbag body, in a seat side view.

13. The vehicle airbag device of claim 1, wherein:

the front-rear chamber has a bag shape by peripheral edge portions of two sheets of superimposed base clothes being sewn at a peripheral edge sewn section; and each of the left-right pair of rear tethers is sewn to the left-right pair of front-rear extension portions at a portion of the peripheral edge sewn section.

14. The vehicle airbag device of claim 13, wherein the left-right pair of rear tethers is sewn together with a reinforcement cloth to the two sheets of superimposed base clothes of the left-right pair of front-rear extension portions at the peripheral edge sewn section.

15. A passenger protection device, comprising:

a vehicle seat for a passenger to sit on; and a vehicle airbag device of installed at a seat rear side of an upper section of the vehicle seat, wherein the vehicle airbag device comprises an inflator that is configured to generate gas during a vehicle collision;

an airbag that is configured to be supplied with the gas and configured to expand and deploy from the seat rear side to a seat front side of the upper section of the vehicle seat; and a left-right pair of rear tethers that couples the airbag to a seatback of the vehicle seat or to a vehicle body, the airbag includes:

a front-rear chamber including a left-right pair of front-rear extension portions that is configured to expand and deploy toward the seat front side past left and right sides of a head of the passenger seated in the vehicle seat, and a coupling portion that links together, in a seat left-right direction, front end portions at completion of expansion and deployment of the left-right pair of front-rear extension portions, and an airbag body that is configured to expand and deploy at the seat rear side of the coupling portion toward a passenger side with a delay with respect to the front-rear chamber, wherein the airbag body is configured to be compressed so as to be sandwiched between a femur area and a chest area of the passenger and contact both the femur area and the chest area of the passenger while the front-rear extension portions are being stretched in a seat front-rear direction during passenger restraint to restrain the passenger, one-end portions of the left-right pair of rear tethers are anchored to the left-right pair of front-rear extension portions, other-end portions of the left-right pair of rear tethers are anchored to the seatback or to the vehicle body, and each of the left-right pair of front-rear extension portions is configured to, during the passenger restraint, be pulled relatively in a seat diagonally rearward and downward direction to cause the coupling portion to approach the femur area of the passenger.

\* \* \* \* \*